(12) United States Patent
Nakashima et al.

(10) Patent No.: US 8,302,941 B2
(45) Date of Patent: Nov. 6, 2012

(54) MICRO-BUBBLE GENERATING DEVICE

(75) Inventors: Yoji Nakashima, Gifu (JP); Koji Yamada, Yamagata (JP)

(73) Assignee: Nakashima Kogyo Corporation, Gifu-Shi (JP)

( * ) Notice: Subject to any disclaimer, the term of this patent is extended or adjusted under 35 U.S.C. 154(b) by 0 days.

(21) Appl. No.: 13/198,246

(22) Filed: Aug. 4, 2011

(65) Prior Publication Data

US 2011/0298142 A1 Dec. 8, 2011

Related U.S. Application Data

(63) Continuation of application No. PCT/JP2010/052195, filed on Feb. 15, 2010.

(30) Foreign Application Priority Data

| Feb. 17, 2009 | (JP) | 2009-033479 |
| Oct. 1, 2009 | (JP) | 2009-229616 |
| Jan. 14, 2010 | (JP) | 2010-000197U |

(51) Int. Cl.
B01F 3/04 (2006.01)

(52) U.S. Cl. ........ 261/64.3; 261/66; 261/79.2; 261/105; 261/122.1

(58) Field of Classification Search ............ 261/26, 261/28, 37, 64.3, 66, 79.2, 122.1, 102, 105
See application file for complete search history.

(56) References Cited

U.S. PATENT DOCUMENTS

| 2,317,101 | A | * | 4/1943 | Lecky | 261/79.2 |
| 2,512,471 | A | * | 6/1950 | Trist | 366/339 |
| 3,885,918 | A | * | 5/1975 | Isahaya | 422/168 |
| 5,535,175 | A | * | 7/1996 | Niimi | 366/336 |
| 5,938,982 | A | * | 8/1999 | Sugiura | 261/75 |
| 6,171,488 | B1 | * | 1/2001 | Morse et al. | 210/221.2 |
| 7,997,563 | B2 | * | 8/2011 | Abe et al. | 261/78.2 |
| 2001/0056256 | A1 | * | 12/2001 | Hughes et al. | 604/85 |
| 2008/0146679 | A1 | * | 6/2008 | Archambeau et al. | 514/789 |
| 2009/0233351 | A1 | | 9/2009 | Akechi | |

FOREIGN PATENT DOCUMENTS

| JP | 02-117337 A1 | 5/1990 |
| JP | 2002-263680 A1 | 9/2002 |
| JP | 2006-015275 A1 | 1/2006 |
| JP | 2006-159187 A1 | 6/2006 |
| JP | 2006-160888 A1 | 6/2006 |
| JP | 3806008 B2 | 8/2006 |
| JP | 2006-320259 A1 | 11/2006 |
| JP | 3130562 U | 3/2007 |
| JP | 3133806 Y1 | 7/2007 |
| JP | 2007-268390 A1 | 10/2007 |

(Continued)

Primary Examiner — Charles Bushey
(74) Attorney, Agent, or Firm — Burr & Brown

(57) ABSTRACT

A micro-bubble generating device is provided which is capable of mixing or dispersing micro-bubbles into a liquid with high stability and has a simple structure that permits reduction of a cost of manufacture. A first member and a first packing are superposed on each other on one side of a gas-permeable film, while a second member and a second packing are superposed on each other on the other side of the gas-permeable film. A pressurized gas delivered via a gas inlet of the first member flows through a fluid passage of the first packing, permeates through the gas-permeable film, and is ejected as micro-bubbles into a liquid flowing through a fluid passage in the form of a narrow shallow strip-like groove provided in the second packing.

4 Claims, 15 Drawing Sheets

FOREIGN PATENT DOCUMENTS

| | | |
|---|---|---|
| JP | 2007-330906 A1 | 12/2007 |
| JP | 2008-221158 A1 | 9/2008 |
| WO | 01/45830 A1 | 6/2001 |
| WO | 2007/077607 A1 | 7/2007 |

* cited by examiner

US 8,302,941 B2

MICRO-BUBBLE GENERATING DEVICE

This application is a continuation of the International Application No. PCT/JP2010/052195 filed on Feb. 15, 2010, which claims the benefit under 35 U.S.C. §119(a)-(d) of Japanese Patent Application No. 2009-033479, filed on Feb. 17, 2009, Japanese Patent Application No. 2009-229616, filed on Oct. 1, 2009, and Japanese Utility Model Registration Application No. 2010-000197, filed on Jan. 14, 2010, the entireties of which are incorporated herein by reference.

FIELD OF THE INVENTION

The present invention relates to a micro-bubble generating device, and more particularly to improvements of a micro-bubble generating device constructed to generate micro-bubbles and mix the micro-bubbles into (with) a liquid or disperse the micro-bubbles into the liquid.

BACKGROUND OF THE INVENTION

In recent years, it has been recognized that bubbles of a size not larger than 1 mm called "micro-bubbles" have various excellent properties, and such micro-bubbles have been drawing a lot of attention. The micro-bubbles are known to exhibit an extremely excellent effect in activation of fishes, domestic animals and plants, and in purification of wastewater, for example.

By the way, there is known a micro-bubble generating device constructed to generate such micro-bubbles and mix the micro-bubbles into a liquid, as disclosed in JP-A-2006-159187, for instance. This micro-bubble generating device has a stationary type mixer provided with a cylindrical body consisting of an upstream screw portion and a downstream cutter portion. Two phases of fluids consisting of a gas and a liquid introduced through inlet tubes into the stationary type mixer are brought into a turbulent state while being subjected to a rotating force and a large torsional force of helical blades of the screw portion, and are then brought into contact with a plurality of protrusions formed on an inner circumferential surface of the cylindrical body, whereby turbulent flows of the two gas-liquid phases are produced to promote resolution of the gas in the liquid.

In such a conventional device, the screw portion of the stationary type mixer has the helical blades disposed within the cylindrical body, and the cutter portion has the plurality of protrusions formed on the inner circumferential surface of the cylindrical body, so that the device is comparatively complicated in construction, and has an accordingly high cost of manufacture. Further, the bubbles generated and mixed into the liquid cannot be really qualified as the micro-bubbles.

Recently, it has been considered to utilize a micro-bubble generating device as a device for supplying oxygen or other gas into water in appreciative-fish or live-fish preservation water tanks, or as ventilation means for drainage treatment tanks, fermentation tanks or culture tanks. Specific constructions of such a micro-bubble generating device are proposed in Japanese Patent No. 3806008 and JP-A-2007-268390.

Under the situation described above, the present applicant proposed a dispersing device (micro-bubble generating cylindrical body) to be used for the micro-bubble generating device to generate the micro-bubbles, as disclosed in Japanese Utility Model Registration No. 3130562. This dispersing device has a cylindrical body which is formed of a porous material and an outer circumferential surface of which is covered by a hydrophilic unwoven fabric or the like. The porous material used for this dispersing device is preferably a gas-permeable film (air-permeable film) that is a high molecular resin film with crazes generated therein.

The dispersing device proposed by the present applicant is immersed in water, and its inner space is supplied with compressed air, oxygen or other gas. The gas changes into micro-bubbles as a result of its permeation through the gas-permeable film or other porous material, and the unwoven fabric, and the micro-bubbles emerging from the surface of the unwoven fabric are dispersed into the water. In this dispersing device wherein the unwoven fabric has a hydrophilic property, the bubbles which permeate through the gas-permeable film and flow into the unwoven fabric are broken down into smaller pieces by the water existing within the unwoven fabric, so that the size of the micro-bubbles generated can be further reduced.

The present inventors have made an analysis of such a dispersing device, in an effort to improve its utility, and have found a risk of reduction of the amount of generation of the micro-bubbles due to clogging or plugging of pores within the unwoven fabric, with foreign matters such as microorganisms and suspended products in the water, which adhere to the surface of or flow into the unwoven fabric during a long period of time of use in the water.

SUMMARY OF INVENTION

The present invention was made in view of the background art described above. It is therefore an object of this invention to provide a micro-bubble generating device which is simple in construction and more economical to manufacture and which permits increased reliability of mixing or dispersing micro-bubbles into a liquid. It is another object of the invention to provide a micro-bubble generating device which permits increased stability of generation of a sufficient amount of micro-bubbles even after a long period of use in water.

To achieve the object described above and other objects which will be understood from the description in the specification taken as a whole and the drawings, the present invention can be suitably carried out in various aspects described below. It is to be understood that the invention may be embodied in any desired combination of those aspects, and that the aspects and technical features of this invention are not limited to those described below, and should be recognized on the basis of the concept of the invention as disclosed in the specification in its entirety and the drawings.

<1> A micro-bubble generating device comprising a first member having a gas inlet, a pair of a first packing and a second packing each having a fluid passage in the form of a strip-like groove, a gas-permeable film, and a second member having a liquid inlet and a liquid outlet, and configured such that the first packing and the second packing are disposed on respective opposite surfaces of the gas-permeable film interposed between the first and second packings and such that the first member is disposed on the side of the first packing remote from the gas-permeable film while the second member is disposed on the side of the second packing remote from the gas-permeable film, whereby a pressurized gas delivered to the gas-permeable film via the gas inlet permeates through the gas-permeable film, and is mixed as micro-bubbles into a liquid flowing through the fluid passage formed in the second packing, wherein the gas-permeable film has a structure which normally has a low degree of gas permeability and permits generation of the micro-bubbles in the liquid by forced permeation of the pressurized gas therethrough, and the fluid passage in the form of the strip-like groove of the second packing has a small width and permits the micro-bubbles to be ejected into the liquid flowing through the fluid passage.

<2> The micro-bubble generating device according to the above-described aspect <1>, wherein the fluid passage formed in the second packing has at least one of a serpentine form, a spiral form and a bent form for increasing its length. That is, the above-described fluid passage formed in the above-described second packing in the micro-bubble generating device according to the above aspect <1> of the invention preferably has a serpentine, spiral, bent or similar form that has a larger length than a straight form.

<3> A micro-bubble generating device comprising: (a) a liquid flow body in the form of a cylindrical column having a flow passage formed in its outer circumferential surface so as to extend in its axial direction so that a liquid flows through the flow passage, an inlet opening which is formed in one of its opposite axial end portions and through which the liquid flows into the flow passage, and an outlet opening which is formed in the other axial end portion and through which the liquid is discharged from the flow passage, wherein the outer circumferential surface is covered by a gas-permeable film so as to close an opening of the flow passage open in the outer circumferential surface; and (b) a casing in the form of a cylindrical sleeve which is open at its opposite ends and which has a gas inlet hole formed through its cylindrical wall and accommodates therein the liquid flow body, the casing and the outer circumferential surface of the liquid flow body define therebetween an internal space accommodating a pressurized gas introduced into the cylindrical sleeve through the gas inlet hole, wherein the flow passage is helically formed in the outer circumferential surface, and the gas-permeable film has a structure which normally has a low degree of gas permeability, and permits generation of micro-bubbles in the liquid by forced permeation of the pressurized gas therethrough.

<4> The micro-bubble generating device according to the above-described aspect <3>, wherein the helically formed flow passage has a width small enough to limit a rate of flow of the liquid through the inlet opening, for increasing a velocity of flow of the liquid from the inlet opening through the flow passage, whereby the micro-bubbles growing at a boundary between the gas-permeable film and the liquid in the flow passage are subject to shearing by the flow of the liquid at the increased velocity through the flow passage, in an initial stage of generation of the micro-bubbles in the liquid as a result of permeation of the pressurized gas through the gas-permeable film, so that the micro-bubbles a size of which is further reduced is generated in the liquid.

<5> The micro-bubble generating device according to the above-described aspect <3> or <4>, further comprising a flow regulating valve to control a rate of flow of the liquid through the inlet opening, thereby controlling a velocity of flow of the liquid through the flow passage, and a regulator to control a pressure of the pressurized gas introduced into the internal space through the gas inlet hole.

<6> The micro-bubble generating device according to any one of the above-described aspects <1> to <5>, wherein the gas-permeable film is formed from a resin film having crazes generated therein.

<7> A micro-bubble generating device disposed in water and configured to generate micro-bubbles and eject and disperse the micro-bubbles into the water, the micro-bubble generating device comprising: (a) a micro-bubble generating sleeve wherein a cylindrical body of a gas-permeable film formed by generating crazes in a high molecular resin film is fitted on an outer circumferential surface of a cylindrical substrate having a gas flow hole formed through its cylindrical wall and open in the outer circumferential surface, and wherein a hydrophilic unwoven fabric layer is formed on an outer circumferential surface of the cylindrical body, whereby a gas fed from the gas inlet hole of the cylindrical substrate changes into the micro-bubbles during permeation of the gas through the cylindrical body and the unwoven fabric layer; (b) rotary driving means for rotating the micro-bubble generating sleeve about its axis, to eject the micro-bubbles from an outer surface portion of the unwoven fabric layer into the water, during rotation of the micro-bubble generating sleeve; and (c) a gas introducing mechanism for introducing the gas from an external source into a space within a sleeve of the cylindrical substrate, during the rotation of the micro-bubble generating device by the rotary driving means.

<8> The micro-bubble generating device according to the above-described aspect <7>, wherein the unwoven fabric layer is a cylindrical body of an unwoven fabric, and the cylindrical unwoven fabric layer is fitted on the cylindrical body of the gas-permeable film.

<9> The micro-bubble generating device according to the above-described aspect <7> or <8>, further comprising a support mechanism for supporting the micro-bubble generating sleeve about a horizontally extending axis.

<10> The micro-bubble generating device according to any one of the above-described aspects <7> to <9>, further comprising a hydrophilic thread-like member wound on an entire surface of the outer surface portion of the unwoven fabric layer, such that an entirety of the unwoven fabric layer is tightened by the thread-like member.

<11> The micro-bubble generating device according to any one of the above-described aspects <7> to <10>, wherein the gas introducing mechanism has an inlet open to an atmosphere for introducing the gas, whereby the gas is introduced by the gas introducing mechanism into the space within the sleeve of the cylindrical substrate.

<12> The micro-bubble generating device according to any one of the above-described aspects <7> to <10>, wherein the gas introducing mechanism has an inlet connected to a compressed-air supply source for supplying a compressed air, whereby the compressed air is introduced by the gas introducing mechanism into the space within the cylindrical substrate.

<13> The micro-bubble generating device according to any one of the above-described aspects <7> to <12>, wherein the micro-bubble generating sleeve is provided with a stirring vane for stirring the water with its rotary motion such that the stirring vane is rotatable with the micro-bubble generating sleeve.

Specifically, unlike the conventional micro-bubble generating device, the micro-bubble generating device of the present invention does not have a complicated construction provided with a screw portion and a cutter portion, and simply employs the gas-permeable film capable of generating the micro-bubbles, through which the gas permeates to generate the micro-bubbles to be mixed or dispersed into the liquid.

Accordingly, the micro-bubble generating device of the present invention described above permits stable mixing of the micro-bubbles into various kinds of liquid, without large-scale equipment, that is, with a simple construction that can reduce cost of manufacture. As a result, by thus mixing or dispersing the micro-bubbles in fuel oil and other oils, for example, combustion efficiency of the oils can be effectively improved. Further, by mixing micro-bubbles of carbonic acid gas into water, water containing the micro-bubbles of carbonic acid gas can be obtained. The water or other liquids containing such micro-bubbles can be not only utilized for liquid purification and as washing or drinking water, but also effectively utilized for wastewater or drainage treatment and other waste-liquid treatments, and for activation of microorganisms.

In the micro-bubble generating device of the present invention, the micro-bubble generating sleeve includes the cylindrical substrate, the gas-permeable film and the hydrophilic unwoven fabric that are fitted on the outer circumferential surface of the cylindrical substrate such that the former is disposed internally, whereby the micro-bubbles are formed by the micro-bubble generating sleeve.

In the micro-bubble generating device of the invention, the micro-bubble generating sleeve is rotated in the water by the rotary driving means while the gas is introduced from the external source into the space within the sleeve of the cylindrical substrate of the micro-bubble generating sleeve, through the gas introducing mechanism, whereby the micro-bubbles can be ejected from the outer surface portion of the unwoven fabric layer and is dispersed into the water. Thus, it is possible to generate the micro-bubbles from the outer surface portion of the unwoven fabric layer. In particular, the micro-bubble generating sleeve is rotated within the water, making it difficult for microorganisms, suspended matters and other foreign matters in the water, to adhere to the outer surface portion (outer circumferential surface) of the unwoven fabric layer or enter into the pores in the unwoven fabric layer. Even if such foreign matters adhere to the outer surface portion of the unwoven fabric layer or enter into the pores, the foreign matters can be effectively removed from the outer surface portion or pores of the unwoven fabric layer, by a centrifugal force produced by the rotation of the micro-bubble generating device. Therefore, the pores in the outer surface portion of the unwoven fabric layer can continually maintain sufficient areas of opening and volumes with a high degree of stability, for a long period of use of the micro-bubble generating device in the water.

Accordingly, the micro-bubble generating device of the invention described above permits stable generation of the further small-sized micro-bubbles in a sufficient amount, and ejection and dispersion of the micro-bubbles into the water, during a long period of use in the water. As a result, the micro-bubble generating device capable of dispersing the micro-bubbles into the water can exhibit a desired effect of activation of domestic animals or plants, or purification of wastewater or drainage, for example, with an extremely high degree of stability for a longer period of time.

In addition, the micro-bubble generating device of the present invention is configured such that the gas is sucked from the space within the cylindrical substrate into the pores in the gas-permeable film and unwoven fabric layer, owing to the centrifugal force produced by the rotation of the micro-bubble generating sleeve and the pressure of ejection of the micro-bubbles, so that the sucked gas is ejected as the micro-bubbles from the outer surface portion of the unwoven fabric layer. In this condition, the space within the cylindrical substrate is placed in a reduced pressure state. Consequently, the gas is automatically and continuously introduced into the space within the cylindrical substrate, during the rotation of the micro-bubble generating sleeve, without forced introduction of a pressurized gas into the space in the cylindrical substrate, and by simply holding an inlet of the gas introducing mechanism open to the atmosphere, for instance, for introducing the gas from the outside of the gas introducing mechanism. Thus, the micro-bubbles can be dispersed from the outer surface portion of the unwoven fabric layer into the water, without using a gas supply source for introducing a compressed gas or other pressurized gas into the micro-bubble generating sleeve, and a gas supply conduit and other devices connected to the gas supply source.

Accordingly, the micro-bubble generating device of the invention described above can be more effectively made simpler and more compact in construction, and permits more economical dispersion of the small-sized micro-bubbles into the water. Here, it is to be understood that the micro-bubbles include bubbles having a nano-meter size.

DETAILED DESCRIPTION OF THE INVENTION

To further clarify the present invention, embodiments of the present invention will be described in detail by reference to the drawings.

Figure 1:
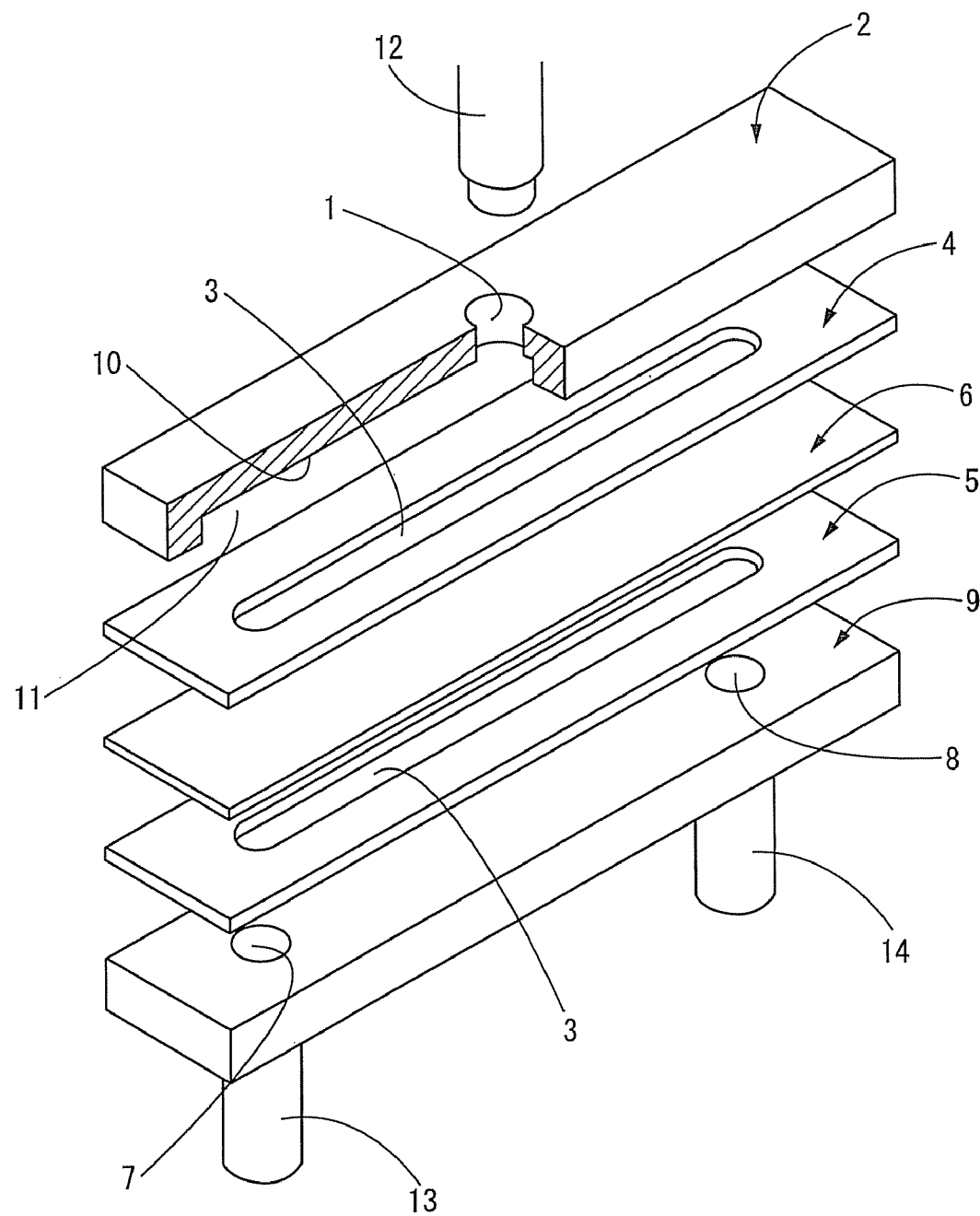
FIG. 1 is an exploded perspective view showing one embodiment of a micro-bubble generating device of the present invention.

Referring first to the exploded perspective view of FIG. 1, there is shown one embodiment of a micro-bubble generating device having a construction of the present invention. As is apparent from FIG. 1, the micro-bubble generating device of the present embodiment has at least: a first member in the form of a gas supply member 2 having an elongate planar shape with a gas inlet 1 formed in its longitudinally central portion; a first packing 4 and a second packing 5 each of which has an elongate planar shape with a small thickness having a fluid passage 3 extending in its longitudinal direction; a gas-permeable film 6; and a second member in the form of a liquid flow member 9 which has an elongate planar shape with a liquid inlet 7 and a liquid outlet 8 respectively formed in its longitudinally opposite end portions.

On the opposite sides of the gas-permeable film 6 as seen in its direction of thickness, the first packing 4 and the second packing 5 are disposed so as to sandwich the gas-permeable film 6 therebetween. The first packing 4 and the second packing 5 are superposed on and bonded to the respective opposite surfaces of the gas-permeable film 6.

The gas supply member 2 has a recess formed in one surface thereof so as to extend in its longitudinal direction. This gas supply member 2 is disposed on one side of the first packing 4 which is remote from the gas-permeable film 6. At the surface having the recess 10 formed therein, the gas supply member 2 is superposed on and bonded to a surface of the first packing 4 remote from the gas-permeable film 6, such that the recess 10 is aligned with the fluid passage 3 in the first packing 4 and such that the gas inlet 1 is open to a central portion of the fluid passage 3 as seen in the longitudinal direction (in the direction of extension). Thus, the gas supply member 2 is superposed on the first packing 4, so as to define a gap 11 corresponding to an inner space of the recess 10. Further, the fluid passage 3 in the first packing 4 is held in communication with the external space through the gap 11 and the gas inlet 1.

The liquid flow member 9 is disposed on one side of the second packing 5 which is remote from the gas-permeable film 6. This liquid flow member 9 is superposed on and bonded to a surface of the second packing 5 remote from the gas-permeable film 6, such that the liquid inlet 7 in the liquid flow member 9 is open to one end portion of the fluid passage 3 in the second packing 5 as seen in the longitudinal direction (in the direction of extension) while the liquid outlet 8 is open to the other end portion of the fluid passage 3 as seen in the longitudinal direction (in the direction of extension). Thus, the fluid passage 3 in the second packing 5 is held at its longitudinally opposite end portions in communication with the external space through the liquid inlet 7 and the liquid outlet 8.

The gas-permeable film 6 is formed from a so-called "crazed film". This crazed film is obtained by subjecting a high molecular resin film to a crazing treatment to generate crazes and thereby giving the resin film gas permeability. The crazes in the present invention have a structure similar to that described in Japanese Patent No. 3156058. Generally, the crazed film exhibits a water repellent property, and has a known structure having a multiplicity of micro pores which permit permeation of a gas but do not permit permeation of water or any other liquid, and a solution in a gel state.

The high molecular resin used for the crazed film may be selected from among thermosetting resins such as polyolefin, polyester, polyamide, styrene resins, polycarbonate, halogen-contained thermosetting resins, and nitrile resins, for example. Specific examples of the above-indicated various kinds of thermosetting resins may be those as disclosed in Japanese Patent No. 3806008, for example. The crazed film is formed from one of those resin materials or a combination of two or more of the resin materials. The crazed film may consist of a single layer or a plurality of layers superposed on each other.

The thickness of the crazed film is not particularly limited, but is generally selected within a range of 0.5-1000 µm, preferably within a range of 1-800 µm, and more preferably within a range of 2-500 µm. The crazes formed in the crazed film basically take the form of stripes extending almost parallel to the direction of molecular orientation of the high molecular resin film, each stripe having a width within a range of 0.5-100 µm, preferably within a range of 1-50 µm. A percentage of the number of crazes in the form of stripes formed through the entire thickness of the film, to the total number of the crazes is preferably at least 10%, more preferably at least 20%, and further preferably at least 40%. Where the percentage of the number of the crazes formed through the film is lower than the above-indicated lower limit, the crazed film is less likely to assure a sufficient degree of gas permeability. The other properties of the crazed film constituting the gas-permeable film 6, other structural features of the crazes, and the method of production of the crazed film are similar to those described in Japanese Patent No. 3806008. The term "crazes" used herein is interpreted to mean regions of the high molecular resin film, which have minute cracks including surface crazes appearing on the surface of the film, and inner crazes formed within the film.

The gas-permeable film 6 is not limited to that formed from the crazed film as described above, and may have a structure which normally has a relatively low degree of gas permeability (low permeability with respect to a gas the pressure of which is almost equal to the atmospheric pressure) but permits generation of micro-bubbles in water as a result of forced permeation of a compressed gas therethrough. The films that can be used as the gas-permeable film 6 having such a structure may be selected from among porous films formed of polypropylene and an organic filler, or similar films having a multiplicity of micro pores formed by a pore-forming processing, and films formed from porous fluororesins having a multiplicity of micro pores, for example.

As described above, the micro-bubble generating device of the present embodiment is a one-piece structure consisting of the gas-permeable film 6 having the structure described above, the first packing 4 and the gas supply member 2 bonded to one of the opposite surfaces of the gas-permeable film 6, and the second packing 5 and the liquid flow member 9 bonded to the other surface of the gas-permeable film 6. To the gas inlet 1 of the gas supply member 2 of this micro-bubble generating device, there is connected a gas supply tube 12 connected to a gas compressing device such as a compressor, which is provided to supply a gas such as air and oxygen in a compressed state.

The compressed gas supplied through the gas supply tube 12 is introduced through the gas inlet 1 into the gap 11 formed between the gas supply member 2 and the first packing 4, and into the fluid flow passage 3 formed in the first packing 4. The compressed gas introduced into the fluid flow passage 3 is forced to permeate through the gas-permeable film 6, while expanding the micro pores (voids) in the gas-permeable film 6, such that the volume of permeation of the compressed gas through the gas-permeable film 6 is restricted by the micro pores. The compressed gas which has permeated through the gas-permeable film 6 is then introduced into the fluid flow passage 3 in the second packing 5. As the compressed gas permeates through the gas-permeable film 6, additional compressed gas is continuously fed through the gas supply tube 12, and accommodated into the gap 11 and the fluid flow passage 3 in the first packing 4.

Further, a liquid supply tube 13 for supplying a liquid such as water and oils is connected to the liquid inlet 7 of the liquid flow member 9, and a liquid discharge tube 14 for discharging the liquid is connected to the liquid outlet 8 of the liquid flow member 9, so that the liquid supplied through the liquid supply tube 13 is introduced into the fluid flow passage 3 in the second packing 5 through the liquid inlet 7, and flows through the fluid flow passage 3 toward the liquid outlet 8, while the liquid is discharged from the fluid flow passage 3 through the liquid outlet 8 and the liquid discharge tube 14.

Thus, in the micro-bubble generating device of the present embodiment, the compressed gas introduced into the gap 11 and the fluid flow passage 3 in the first packing 4 is forced to permeate through the gas-permeable film 6 while the volume of permeation of the gas is restricted by the micro pores. The compressed gas which has permeated through the gas-permeable film 6 is mixed in the form of micro-bubbles into the liquid flowing through the fluid flow passage 3 in the second packing 5. It will be understood from the following equation that the micro-bubbles consisting of the compressed gas are easily mixed in the liquid:

$$W = kP$$

In the above equation, "W" represents a mass of the gas resolved in the liquid, "P" represents a pressure of the gas, while "k" represents a proportional constant. It follows from the above equation that the mass of the gas resolved in the liquid is proportional to the pressure of the gas. Namely, the volume of the gas resolved in the liquid increases with an increase of the pressure of the gas in contact with the liquid.

In the present micro-bubble generating device, each of the first packing 4 and the second packing 5 has the elongate planar shape with a small thickness, so that the fluid flow passages 3, 3 formed in the respective first and second packings 4, 5 take the form of a strip-like shallow groove. Each of the fluid flow passage 3, 3 has a sufficiently small width, and extends linearly in the longitudinal direction of the first and second packings 4, 5.

Since the fluid flow passage 3 in the second packing 5 through which the liquid flows for mixing the micro-bubbles into the liquid takes the form of the strip-like shallow groove, as described above, the amount of the gas mixed into the liquid per unit volume is effectively increased. Further, a flow of the pressurized liquid into which the gas is easily resolved is formed within the fluid flow passage 3, and a large volume of the liquid flows through the fluid flow passage 3, in contact with the gas-permeable film 6.

Since the fluid flow passage 3 has the small width, the area of entry of the liquid at the liquid inlet 7 is limited, so that a velocity of flow of the liquid from the liquid inlet 7 through the fluid flow passage 3 is relatively high. Accordingly, the micro-bubbles growing at a boundary between the gas-permeable film 6 and the liquid in the fluid flow passage 3 are subject to shearing by the high-velocity flows of the liquid through the fluid flow passage 3, in an initial stage of generation of the micro-bubbles in the liquid as a result of permeation of the compressed gas through the gas-permeable film 6. Consequently, the micro-bubbles the size of which is further reduced can be generated, with a high degree of stability, in the liquid flowing through the fluid flow passage 3.

Where water is used as the liquid while air is used as the gas in the micro-bubble generating device described above, micro-bubbles of from about 20 nm to about 5 μm can be easily generated, and can be easily mixed into the water flowing through the fluid flow passage 3 in the second packing 5. Even the visible micro-bubbles generated by this micro-bubble generating device have a small value of buoyancy and are free to move within the water. The invisible micro-bubbles are resolved or mixed in the water and stay within the water. Thus, the micro-bubble generating device of the present embodiment permits easy and stable production of a gas-liquid mixture containing a sufficient amount of micro-bubbles.

As described above, the micro-bubble generating device of the present embodiment permits stable mixing of micro-bubbles into various kinds of liquid, without large-scale equipment, that is, with a simple construction at a reduced cost of manufacture.

The present micro-bubble generating device can be very advantageously used in medical, agricultural, fisheries, environmental, water treatment, mining, and other fields that utilize micro-nano bubbles. In particular, the present micro-bubble generating device permits production of a gas-liquid mixture having a high content of gas, and is accordingly expected to be utilized in wastewater treatment, water purification and other aqueous treatment fields.

Figure 2:
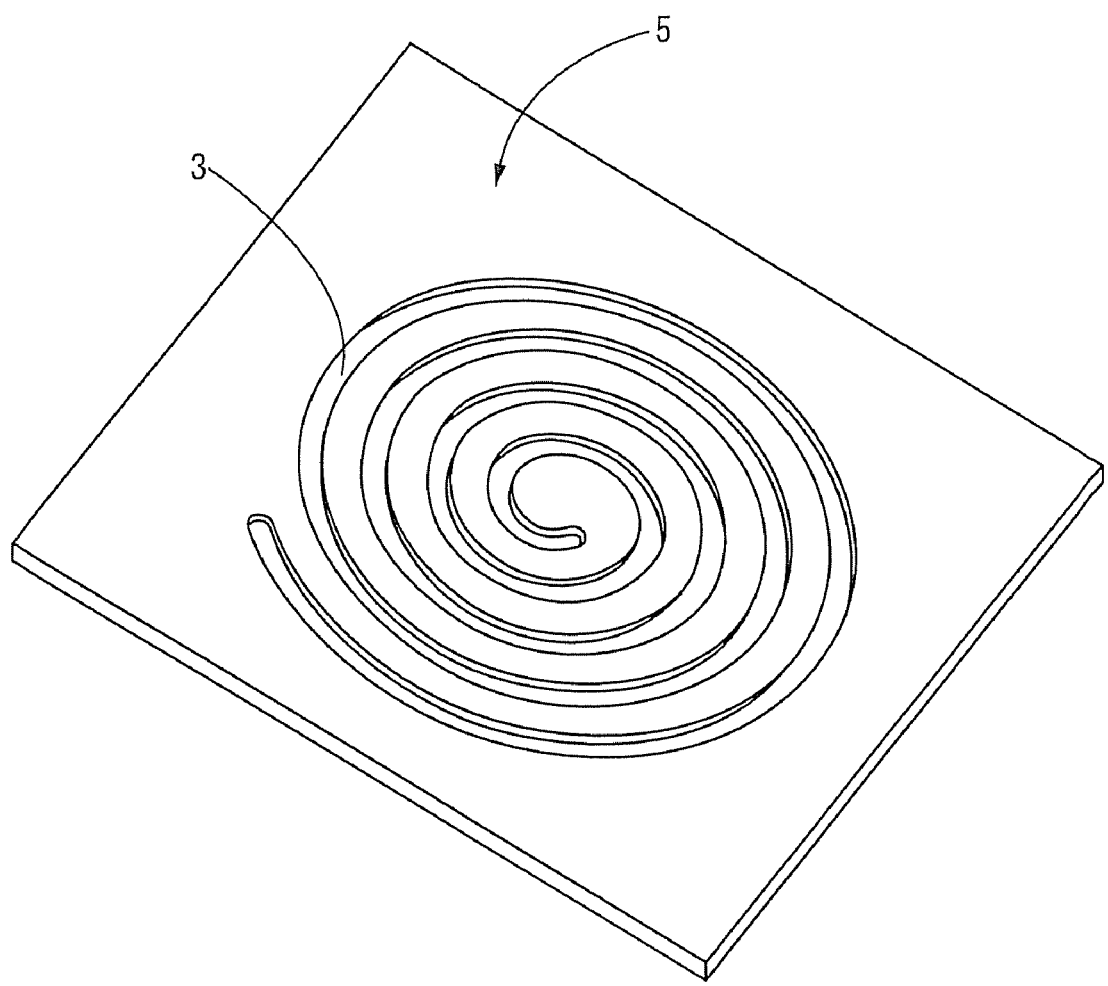
FIG. 2 is a perspective view showing another example used in place of a packing provided in the micro-bubble generating device shown in FIG. 1.
Figure 3:
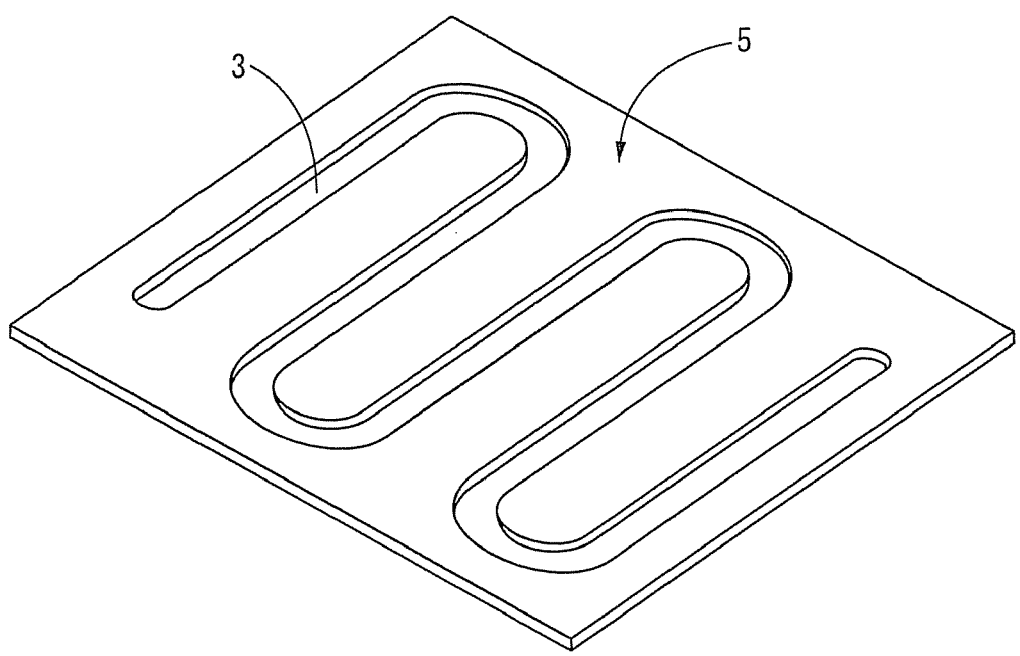
FIG. 3 is a perspective view showing a further example used in place of the packing provided in the micro-bubble generating device shown in FIG. 1.

In the embodiment described above, the fluid flow passage 3 through which the liquid flows for mixing the micro-bubbles into the liquid is formed in the second packing 5 so as to extend along a straight line. However, the form of the fluid flow passage 3 is not limited to the linear form. For example, the fluid flow passage 3 in the second packing 5 may have a spiral form as shown in FIG. 2, a serpentine or meandering form as shown in FIG. 3, or a bent or curved form having a plurality of points of bending or curvature, although not shown in the drawings. These modified forms make it possible to maximize the length of the fluid flow passage 3 formed in a predetermined surface area of the second packing 5, and to effectively reduce the required size of the second packing 5 and accordingly the required overall size of the micro-bubble generating device.

Figure 4:
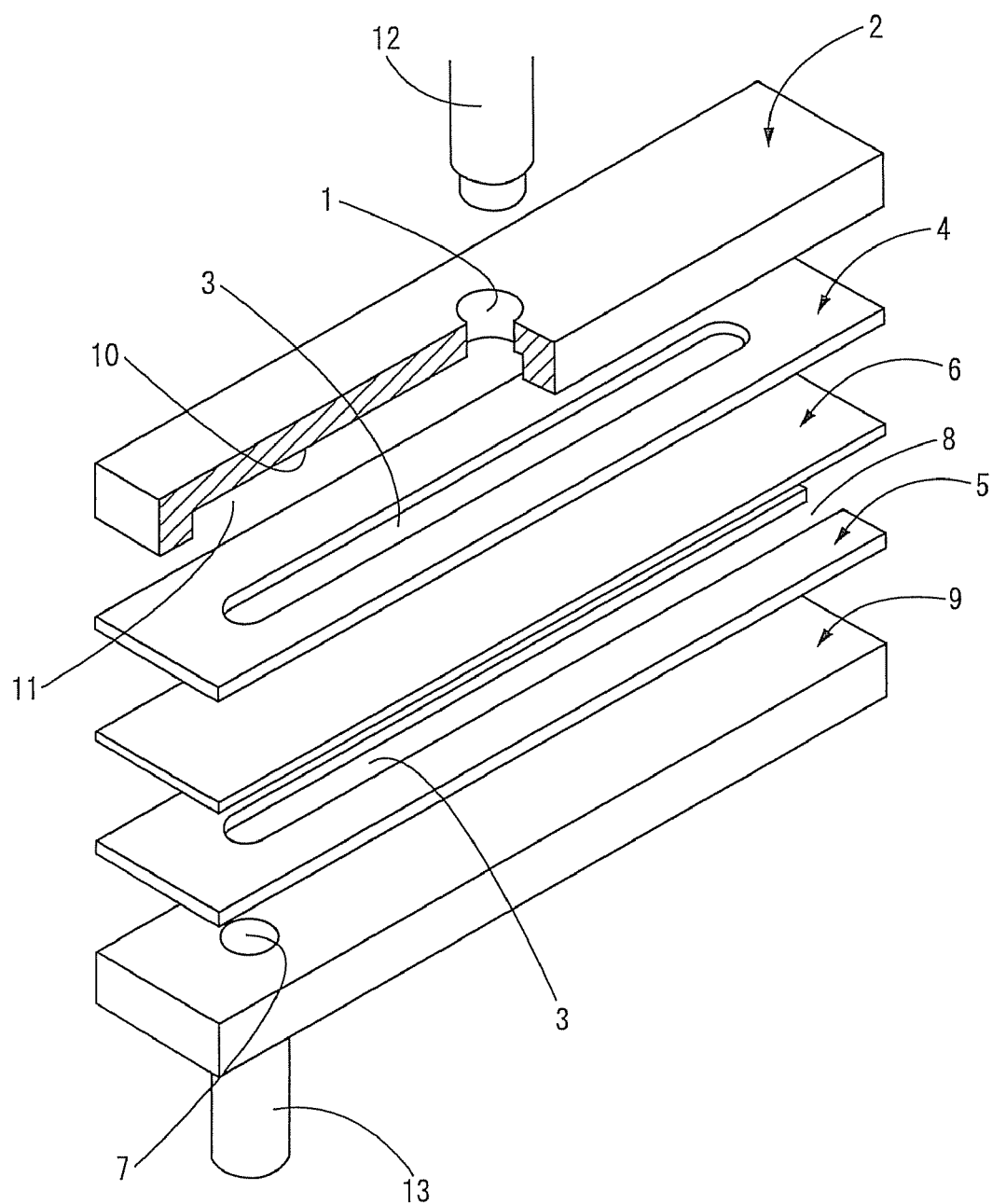
FIG. 4 is a view corresponding to FIG. 1, showing another embodiment of the micro-bubble generating device of the present invention.

Further, as shown in FIG. 4, the micro-bubble generating device may be modified such that the liquid flow member 9 is not provided with the liquid outlet 8 while the fluid flow passage 3 in the second packing 5 is open endwise at one of the longitudinally opposite ends remote from the liquid inlet 7, so that the open end of the fluid flow passage 3 serves as the liquid outlet 8.

Figure 5:
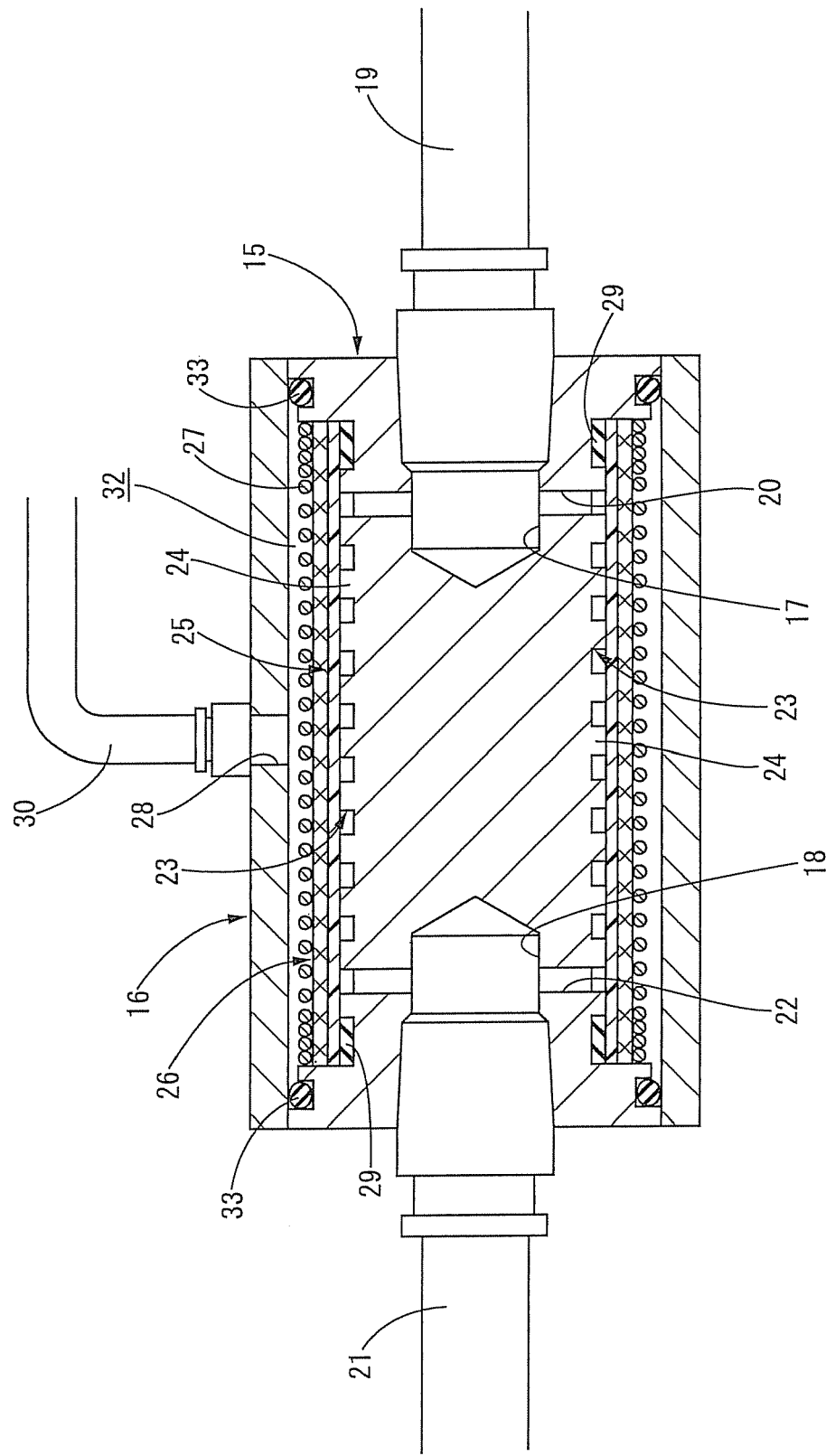
FIG. 5 is an axial cross sectional view showing a further embodiment of the micro-bubble generating device of the present invention.

Referring next to the cross sectional view of FIG. 5, there is shown a micro-bubble generating device constructed according to another embodiment of this invention. As is apparent from FIG. 5, the micro-bubble generating device of this embodiment has a liquid flow body 15 in the form of a cylindrical column, and a cylindrical casing 16 accommodating therein the cylindrical liquid flow body 15.

Figure 6:
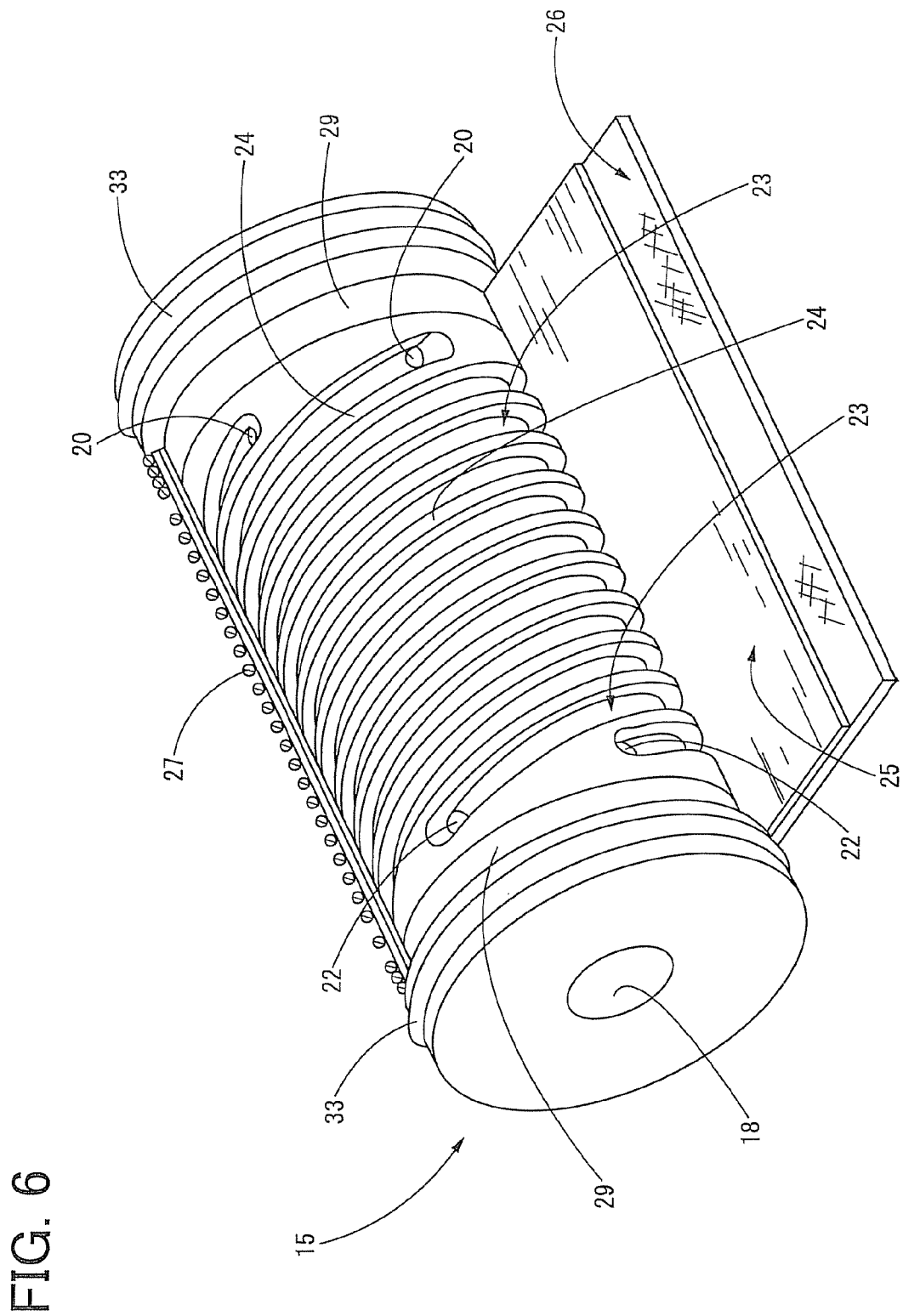
FIG. 6 is a perspective view showing a liquid flow body provided in the micro-bubble generating device shown in FIG. 5.

Described in detail, as shown in FIG. 5 and FIG. 6, the liquid flow body 15 has an inlet opening 17 and an outlet opening 18 in respective one and the other of its axial end faces, each of the inlet opening 17 and outlet opening 18 being formed as a hole having a predetermined depth. The inlet opening 17 has an open end connected to a liquid supply tube 19. This liquid supply tube 19 is connected to a liquid supply device such as a pump for delivering water, oil or any other liquid, and is provided with a flow regulator valve (not shown), so that the liquid a pressure of which is regulated is fed from the liquid supply tube 19 into the inlet opening 17. A plurality of (two in this specific example) liquid inlet passages 20 are formed through a bottom portion of an inner circumferential surface of the inlet opening 17. These liquid inlet passages 20 are through-holes extending through a cylindrical wall defining the inlet opening 17, and are open in one axial end portion of the outer circumferential surface of the liquid flow body 15.

The outlet opening 18 has an open end connected to a liquid discharge tube 21. A plurality of (two in this specific example) liquid outlet passages 22 are formed through a bottom portion of an inner circumferential surface of the outlet opening 18. These liquid outlet passages 22 are through-holes extending through a cylindrical wall defining the outlet opening 18, and are open in the other axial end portion of the outer circumferential surface of the liquid flow body 15. The liquid discharge tube 21 has an external end portion formed in the form of a nozzle a diameter of which gradually decreases in an axial direction toward its extreme end.

A plurality of (two in this specific example) U-shaped flow passages 23 through which the liquid flows are formed in the outer circumferential surface of the liquid flow body 15, such that the U-shaped flow passages 23 are defined by side walls in the form of partition walls 24. Each of the U-shaped flow passages 23 has sufficiently small width and depth, and takes the form of a helical groove having a plurality of turns in the circumferential direction of the liquid flow body 15 such that the turns are spaced apart from each other in the axial direction of the liquid flow body 15. Each of the liquid inlet passages 20 is open in a bottom surface of one end portion of the corresponding one of the U-shaped flow passages 23 (in one axial end portion of the liquid flow body 15), and each of the liquid outlet passage 22 is open in a bottom surface of the other end portion of the corresponding U-shaped flow passage 23 (in the other axial end portion of the liquid flow body 15). Thus, each U-shaped flow passage 23 is held in its one axial end portion in communication with the inlet opening 17 through the corresponding liquid inlet passage 20, and in its other axial end portion in communication with the outlet opening 18 through the corresponding liquid outlet passage 22.

In the above-described arrangement, the liquid supplied from the liquid supply tube 19 into the inlet opening 17 is introduced into each of the U-shaped flow passages 23 through the liquid inlet passages 20. The introduced liquid which flows through the U-shaped flow passages 23 is introduced into the outlet opening 18 through the liquid outlet passages 22, and then discharged through the liquid discharge tube 21. It will be understood from the foregoing description that the liquid inlet passages 20 and the inlet opening 17 cooperate to define a liquid inlet while the liquid outlet passages 22 and the outlet opening 18 cooperate to define a liquid outlet, in the present embodiment. In this respect, it is noted that the liquid inlet and outlet need not include the respective liquid inlet and outlet passages, and may be held in direct communication with the flow passages.

A gas-permeable film 25 is wound on the outer circumferential surface of the liquid flow body 15. Namely, the gas-permeable film 25 covers the outer circumferential surface of the liquid flow body 15 such that the gas-permeable film 25 is held in tight contact with the end faces of the partition walls 24, so as to close the openings of the U-shaped flow passages 23 that are open in the outer circumferential surface of the liquid flow body 15.

This gas-permeable film 25 has the same structure as that used in the micro-bubble generating device of the embodiment described above. For example, the gas-permeable film 25 may be a crazed film, a film having a multiplicity of micro pores formed by a pore-forming processing, or a film formed from a porous fluororesin having a multiplicity of micro pores. In the present embodiment, the crazed film is used as the gas-permeable film 25.

On the outer circumferential surface of the liquid flow body 15, there is further disposed an unwoven fabric 26 such that the unwoven fabric 26 covers the outer surface of the gas-permeable film 25. This unwoven fabric 26 is provided to protect the gas-permeable film 25 against deformation or separation from the outer circumferential surface of the liquid flow body 15, which would take place due to the gas or liquid pressure acting thereon. In this sense, the material of the unwoven fabric 26 is not particularly limited, provided the material has gas permeability and formability.

On the outer circumferential surface of the unwoven fabric 26, a thread-like wire member 27 is wound such that turns of the wire member 27 are spaced from each other by a suitable spacing distance. This thread-like wire member 27 is also provided to protect the gas-permeable film 25 against separation from the liquid, flow body 15. In this sense, the material of the thread-like wire member 27 is not particularly limited, but preferably has high degrees of water and oil resisting properties. In this respect, fish lines are preferably used as the thread-like wire member 27. It is noted that reference sign 29 in FIG. 5 represents sealing rings for liquid-tight or gas-tight sealing between the outer circumferential surface of the liquid flow body 15 and the gas-permeable film 25.

Further, the casing 16 is an outer cylindrical sleeve which is open at its opposite ends and which has a larger diameter than the liquid flow body 15. The casing 16 has a gas inlet hole 28 formed through an axially intermediate portion of its cylindrical wall. To the gas inlet hole 28, there is connected a gas supply tube 30 connected to a gas compressing device such as a compressor, which is provided to supply a gas such as air and oxygen in a compressed state. Although not shown, this gas supply tube 30 is provided with a regulator, which controls a pressure of a pressurized gas introduced into the gas inlet hole 28 through the gas supply tube 30.

The casing 16 accommodates therein the liquid flow body 15. With the liquid flow body 15 being thus housed in the casing 16, an internal space 32 is formed between the outer circumferential surface of the gas-permeable film 25 (more precisely, of the unwoven fabric 26) covering the outer circumferential surface of the liquid flow body 15, and the inner circumferential surface of the casing 16. It is noted that reference sign 33 in FIG. 5 represents O-rings for liquid-tight and gas-tight sealing between the outer circumferential surface of the liquid flow body 15 and the inner circumferential surface of the casing 16. The sealing structure between the liquid flow body 15 and the casing 16, and the sealing structure between the liquid flow body 15 and the gas-permeable film 25 are not limited to those described above.

Thus, the pressurized gas supplied from the gas supply tube 30 is accommodated in the internal space 32 within the casing 16, through the gas inlet hole 28. The gas accommodated in the internal space 32 is forced to permeate through the unwoven fabric 26 and the gas-permeable film 25 while the volume of permeation of the gas is restricted. The compressed gas which has permeated through the gas-permeable film 25 is mixed in the form of micro-bubbles into the liquid flowing through the U-shaped flow passage 23, as in the micro-bubble generating device of the embodiment described above. Since the gas permeating through the gas-permeable film 25 is compressed, the micro-bubbles are easily mixed into the liquid, as in the preceding embodiment.

In the micro-bubble generating device of the present embodiment, the U-shaped flow passages 23 have the sufficiently small depth, so that the amount of the gas mixed into the liquid per unit volume is effectively increased. Further, a flow of the pressurized liquid into which the gas is easily resolved is formed within the U-shaped flow passages 23, and a large volume of the liquid flows through the U-shaped flow passages 23, in contact with the gas-permeable film 25.

Since the U-shaped flow passages 23 have the sufficiently small width, the area of entry of the liquid into the liquid inlet passages 20 is limited, so that a velocity of flow of the liquid through the U-shaped flow passages 23 is relatively high. Accordingly, the micro-bubbles growing at a boundary between the gas-permeable film 25 and the liquid in the U-shaped flow passages 23 are subject to shearing by the high-velocity flows of the liquid through the U-shaped flow passages 23, in an initial stage of generation of the micro-bubbles in the liquid as a result of permeation of the compressed gas through the gas-permeable film 25. Consequently, the micro-bubbles the size of which is further reduced can be generated, with a high degree of stability, in the liquid flowing through the U-shaped flow passages 23.

Further, the U-shaped flow passages 23 in the form of helical grooves can be formed in the outer circumferential surface of the liquid flow body 15, which has the predetermined surface area. Accordingly, a larger number of micro-bubbles can be mixed into the liquid flowing through the U-shaped flow passages 23. Further, the size of the liquid flow body 15, and therefore the size of the micro-bubble generating device can be effectively reduced.

As described above, the micro-bubble generating device of the present embodiment also permits stable mixing of micro-bubbles in various kinds of liquid, without large-scale equipment, that is, with a simple construction economical to manufacture.

In addition, the liquid supply tube 19 used in the micro-bubble generating device of the present embodiment is provided with a flow regulating valve, and the gas supply tube 30 is provided with a regulator, so that the liquid and the pressurized gas the pressures of which are suitably controlled are introduced into the U-shaped flow passages 23. Accordingly, the micro-bubbles can be efficiently mixed into the liquid in a condition suitable for the specific properties of the liquid. Where a fuel oil is used as the liquid while air or the like is used as the gas to be mixed into the liquid, for instance, the liquid containing the desired micro-bubbles can be generated by adjusting the rate of flow of the fuel oil having a higher degree of viscosity than the water, with the flow regulating valve, to thereby control the pressure of the fuel oil, and by controlling the pressure of the air or other gas permeating through the gas-permeable film 25, with the regulator, such that the pressure of the gas is higher than that of the fuel oil by a suitable amount.

The present micro-bubble generating device can also be very advantageously used in medical, agricultural, fisheries, environmental, water treatment, mining, and other fields that utilize micro-nano bubbles. In particular, the present micro-bubble generating device permits production of a gas-liquid mixture having a high content of gas, and is accordingly expected to be utilized in wastewater treatment, water purification and other aqueous treatment fields.

Figure 7:
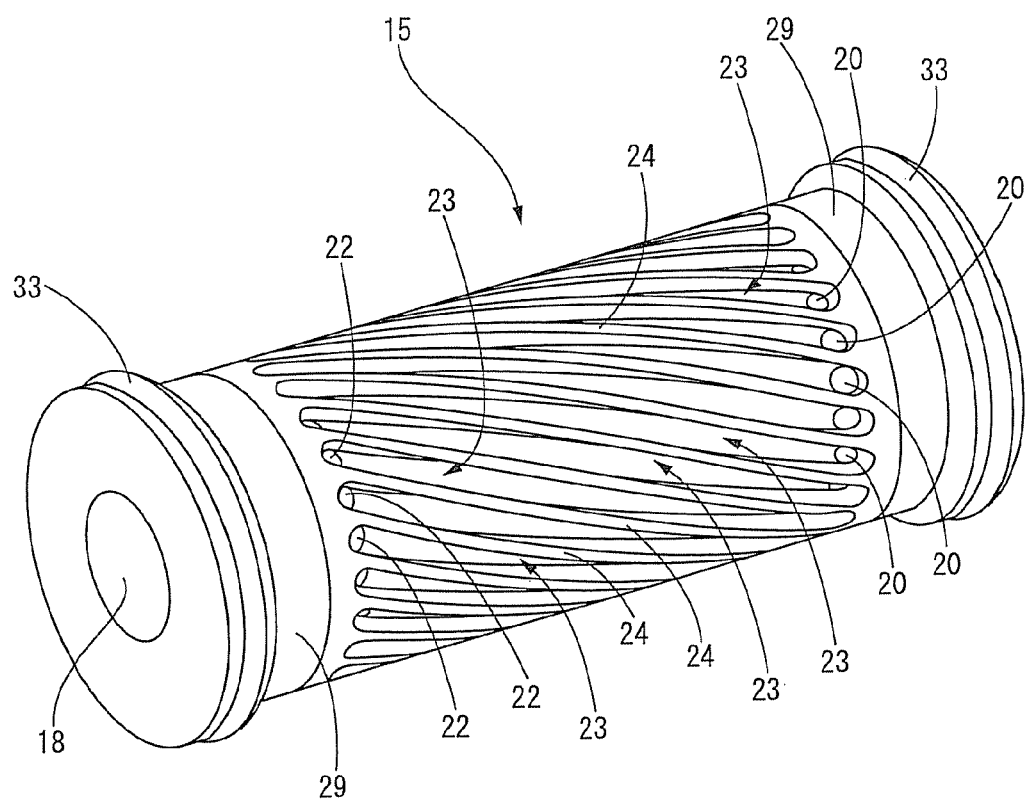
FIG. 7 is a view corresponding to FIG. 6, showing another example used in place of the liquid flow body provided in the micro-bubble generating device shown in FIG. 5.

In the present embodiment described above, the U-shaped flow passages 23 formed in the outer circumferential surface of the liquid flow body 15 take the form of helical grooves each having a plurality of helical turns in the circumferential direction of the liquid flow body 15 such that the helical turns are spaced apart from each other in the axial direction of the liquid flow body 15. However, the U-shaped flow passages 23 may be otherwise helically formed in the outer circumferential surface of the liquid flow body 15. For example, each U-shaped flow passage 23 may be a helical groove having less than one full turn in the circumferential direction of the liquid flow body 15, as shown in FIG. 7.

Figure 8:
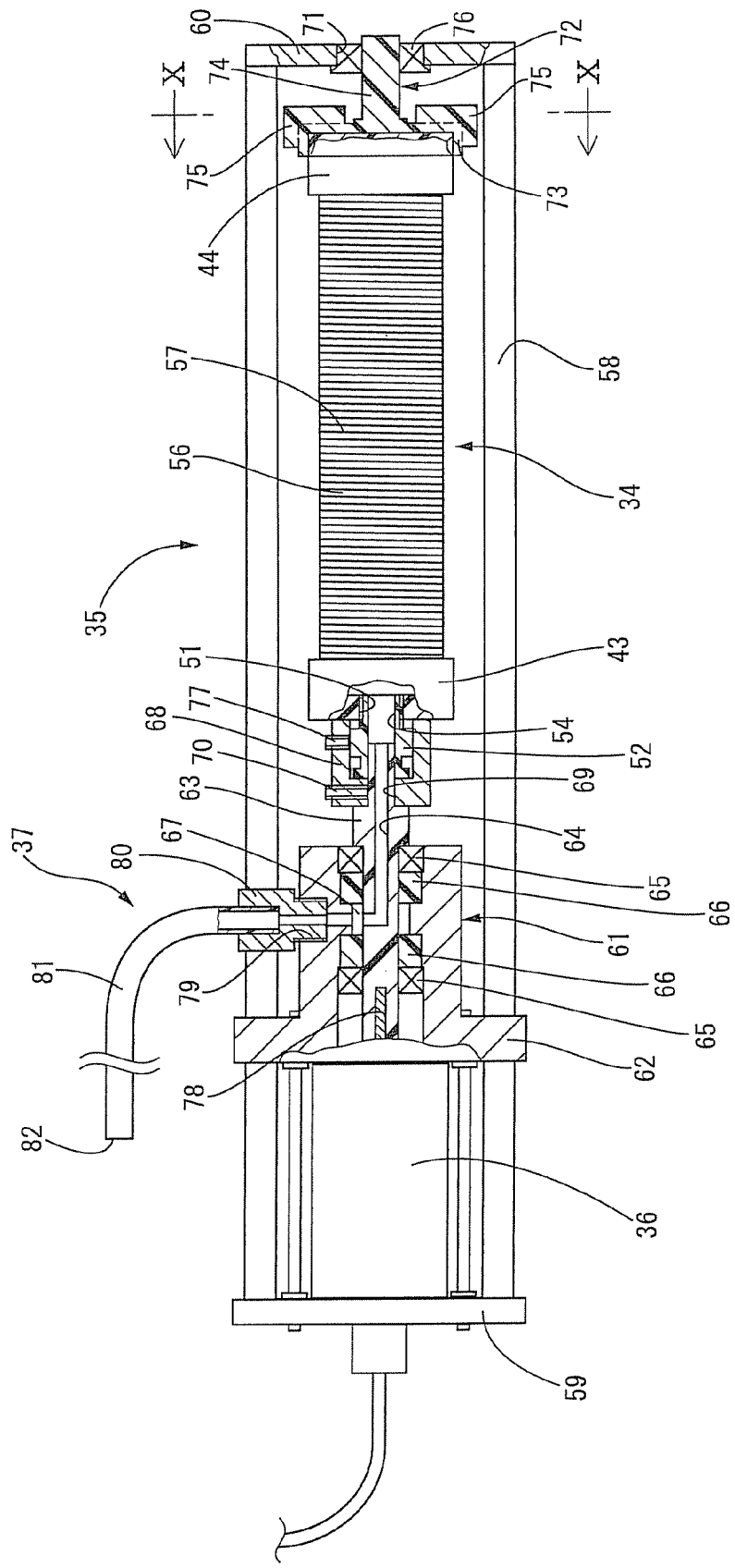
FIG. 8 is a front elevational view partially in cross section, showing a still further embodiment of the micro-bubble generating device of the present invention.

Referring next to the front elevational view of FIG. 8, there is shown a micro-bubble generating device constructed according to a further embodiment of this invention. As is apparent from FIG. 8, the micro-bubble generating device of this embodiment includes a micro-bubble generating sleeve 34, a support mechanism 35 for rotatably supporting the micro-bubble generating sleeve 34, rotary driving means in the form of a submersible motor 36, and a gas introducing mechanism 37 for introducing a gas into the micro-bubble generating sleeve 34.

Figure 9:
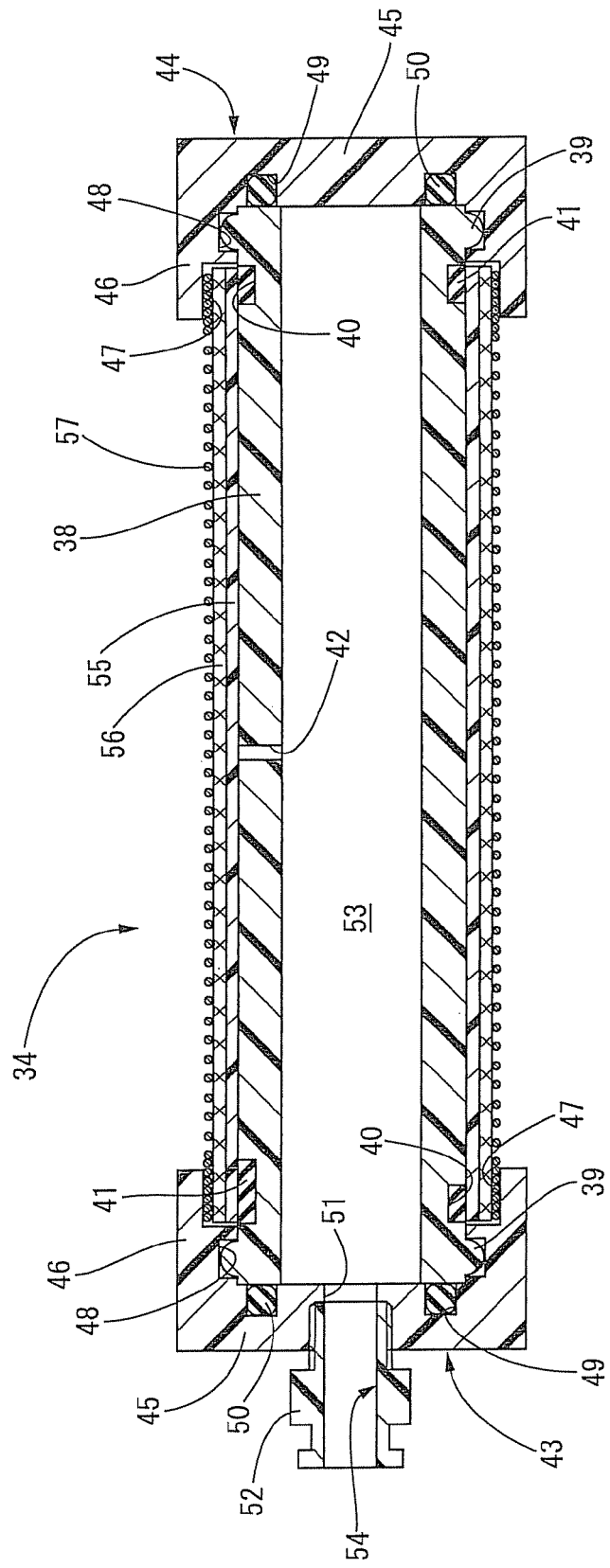
FIG. 9 is an axial cross sectional view of a micro-bubble generating sleeve used in the micro-bubble generating device shown in FIG. 8.

Described in detail, the micro-bubble generating sleeve 34 has a cylindrical substrate 38, as shown in FIG. 9. This cylindrical substrate 38 is an elongate cylindrical resin body formed of a resin material. The resin material used for forming the cylindrical substrate 38 is not particularly limited, provided the resin material has a degree of rigidity high enough to permit high-speed rotation of the cylindrical substrate 38 in water. In the present embodiment, the cylindrical substrate 38 is formed of a vinyl chloride resin. Of course, the cylindrical substrate 38 may be formed of a material other than a resin material, such as a metallic material.

The cylindrical substrate 38 has engaging protrusions 39 formed at respective opposite axial ends of its outer circumferential surface such that each of the engaging protrusions 39 continuously extends the entire circumference of the outer circumferential surface, and has a predetermined height and a semi-circular shape in axial cross section. The cylindrical substrate 38 further has circumferential grooves 40 formed axially inwardly of the corresponding engaging protrusions 39 and each having a rectangular shape in axial cross section. An annular sealing rubber 41 is fitted and accommodated in the corresponding one of the circumferential grooves 40, 40. The cylindrical substrate 38 further has a gas flow hole 42 formed through an axially intermediate portion thereof, at one position in its circumferential direction, such that the flow hole 42 extends through a cylindrical wall of the cylindrical substrate 38 and is open in the outer circumferential surface of the cylindrical wall. The cylindrical substrate 38 may have a plurality of flow holes 42.

The cylindrical substrate 38 having a structure described above is provided at its opposite axial end portions with a first cap 43 and a second cap 44 fixed thereto. Both of the first and second caps 43, 44 have the same one-piece cylindrical structure consisting of a bottom portion 45 and a cylindrical portion 46 and having a relatively shallow cylindrical hole. Each of the first and second caps 43, 44 has a cutout groove 47 formed circumferentially in an axial open end portion of its inner circumferential surface such that the cutout groove 47 is open in the axially outward direction (in the axial direction in which the cylindrical portion is open). Each of the first and second caps 43, 44 further has an engaging groove 48 formed circumferentially in an axial end portion of its inner circumferential surface on the side of the bottom portion 45, and also has an annular groove 49 formed circularly in a radially outer portion of a surface of the bottom portion 45. An O-ring 50 is fitted and accommodated in this annular groove 49. Further, the bottom portion 45 of the first cap 43 has a through-hole 51 formed in a radially central portion of its surface such that the through-hole 51 is threaded on its inner circumferential surface. A connecting sleeve 52 threaded on its outer circumferential surface is fixedly screwed in the internally threaded through-hole 51.

The first and second caps 43, 44 constructed as described above are attached to the cylindrical substrate 38 such that bottom portions 45 of the first and second caps 43, 44 close the respective opposite axial open ends of the cylindrical substrate 38, with the cylindrical portions 46 being fitted on the opposite axial end portions of the cylindrical substrate 38 such that the engaging protrusions 39 formed on the opposite axial end portions of the cylindrical substrate 38 are fitted in the respective engaging grooves 48, in abutting contact with the side surfaces of the engaging grooves 48. Further, the opposite axial end faces of the cylindrical substrate 38 are held in pressing contact with the O-rings 50 fitted in the annular grooves 49 of the caps 43, 44.

Thus, the first and second caps 43, 44 are effectively prevented from being easily removed from the cylindrical substrate 38, and a center hole of the cylindrical substrate 38 is fluid-tightly and air-tightly closed by the first and second caps 43, 44, to define an inner space 53. This inner space 53 is held in communication with the external space through only an inlet hole 54 and the above-described threaded hole formed through the axially intermediate portion of the cylindrical substrate 38. The inlet hole 54 is formed by the through-hole 51 formed through the first cap 43 and a hole formed through the connecting sleeve 52 fixed to the first cap 43. Further, the bottom surfaces of the cutout grooves 47 in the cylindrical portions 46 of the first and second caps 43, 44 are opposed to the outer circumferential surfaces of the sealing rubbers 41 fitted in the circumferential grooves 40, 40 in the opposite axial end portions of the cylindrical substrate 38, in the radial direction of the cylindrical substrate 38.

On the cylindrical substrate 38 having a structure described above, there is fitted a cylindrical film body 55 formed from a gas-permeable film. In the present embodiment, a so-called "crazed film" formed by generating crazes in a high molecular resin film in a manner known in the art is used as the gas-permeable film which constitutes the cylindrical film body 55. This crazed film generally exhibits a water repellent property, and has a known structure having a multiplicity of micro pores which permit permeation of a gas but do not permit permeation of water or any other liquid, and a solution in a gel state. The crazed film used in this embodiment has a structure similar to that of the gas-permeable film used in the first and second embodiments described above.

In the present embodiment, the crazed film as described above is wound on the outer circumferential surface of the cylindrical substrate 38 such that the opposite end portions of the crazed film are superposed on each other to form a cylindrical shape. In this condition, the mutually superposed opposite end portions are bonded together by welding or any other bonding method, to thereby form the cylindrical film body 55. Thus, the cylindrical film body 55 is fitted on the cylindrical substrate 38, in tight contact with the outer circumferential surface of the cylindrical substrate 38. Of course, the cylindrical film body 55 may be formed by bonding together the opposite end portions of the crazed film after the crazed film is wound on the outer circumferential surface of the cylindrical substrate 38.

The cylindrical film body 55 has an axial length not larger than an axial length between the engaging protrusions 39, 39 formed in the opposite axial end portions of the cylindrical substrate 38, so that the opposite axial end portions of the cylindrical film body 55 fitted on the cylindrical substrate 38 are disposed within the cutout grooves 47 of the first and second caps 43, 44 attached to the opposite end portions of the cylindrical substrate 38, such that the inner circumferential surfaces of the opposite axial end portions of the cylindrical film body 55 are held in contact with the outer circumferential surfaces of the sealing rubbers 41, 41 fitted in the circumferential grooves 40, 40 of the cylindrical substrate 38. The gas flow hole 42 which is formed through the axially intermediate cylindrical portion of the cylindrical substrate 38 is closed by an axially intermediate portion of the cylindrical film body 55, at its end open in the outer circumferential surface of the cylindrical substrate 38.

Further, a cylindrical unwoven fabric layer 56 formed of an unwoven fabric material having a hydrophilic property is fitted on the outer circumferential surface of the cylindrical film body 55 fitted on the outer circumferential surface of the cylindrical substrate 38. The unwoven fabric material used as the cylindrical unwoven fabric layer 56 is not particularly limited, provided the unwoven fabric material has a hydrophilic property. For instance, the unwoven fabric material is selected from among: a pulpous unwoven fabric using a pulp as a base material; a chemical fiber unwoven fabric using a chemical fiber as a base material; and a compound unwoven fabric using a combination of at least two kinds of materials selected from the pulp, the chemical fiber, a glass fiber and a metallic fiber. Where the chemical fiber is used as the base material, the chemical fiber may be selected from polyvinyl alcohol, polyethylene, polypropylene, polyamide, and acrylic resin, for example.

The unwoven fabric as described above is wound on the outer circumferential surface of the cylindrical film body 55 fitted on the cylindrical substrate 38 such that the opposite edge portions of the unwoven fabric overlap each other to form a cylindrical shape. In this condition, the mutually overlapping opposite edge portions are bonded together by welding or any other bonding method, to thereby form the cylindrical unwoven fabric layer 56. Thus, the cylindrical unwoven fabric layer 56 is fitted on the cylindrical film body 55, in tight contact with the outer circumferential surface 38 of the cylindrical film body 55.

While the thickness and axial length of the cylindrical unwoven fabric layer 56 are suitably determined, the thickness is generally selected within a range from about 400 μm to about 470 μm. In this embodiment, the axial length of the cylindrical unwoven fabric layer 56 is selected to be substantially equal to that of the cylindrical film body 55, so that like the opposite axial end portions of the cylindrical film body 55, the opposite axial end portions of the cylindrical unwoven fabric layer 56 are disposed within the cutout grooves 47 of the first and second caps 43, 44 attached to the opposite end portions of the cylindrical substrate 38, such that the inner circumferential surfaces of the opposite axial end portions of the cylindrical unwoven fabric layer 56 are held in contact with the outer circumferential surfaces of the sealing rubbers 41, 41 fitted in the circumferential grooves 40, 40 of the cylindrical substrate 38, via the opposite axial end portions of the cylindrical substrate 38.

Further, a hydrophilic thread-like member 57 is wound on the entire outer circumferential surface of the cylindrical unwoven fabric layer 56 thus fitted on the cylindrical film body 55 on the cylindrical substrate 38. A material used for the thread-like member 57 is not particularly limited, provided the material has a hydrophilic property and a sufficiently high tensile strength. For example, the material is selected from among natural fibers such as silk, cotton and hemp, and the above-described kinds of chemical fiber used for the cylindrical unwoven fabric layer 56. In particular, the thread-like member 57 is preferably formed of a polyvinyl alcohol fiber which has a high degree of chemical resistance and which is not biologically decomposed. While the diameter (thickness) of the thread-like member 57 is suitably determined so as to give the thread-like member 57 a sufficiently high tensile strength, the diameter is preferably selected within a range from about 50 μm to about 500 μm.

The hydrophilic thread-like member 57 as described above is wound on the entire outer circumferential surface of the cylindrical unwoven fabric layer 56, to securely tighten the entirety of the cylindrical unwoven fabric layer 56, so that the fibers constituting the cylindrical unwoven fabric layer 56 are tightened together such that the micro pores formed within the cylindrical unwoven fabric layer 56 are much more small-sized.

It is noted here that the thread-like member 57 is preferably wound over the entire area of the outer circumferential surface of the cylindrical unwoven fabric layer 56, but may be wound over only a selected area of the outer circumferential surface of the cylindrical unwoven fabric layer 56. It is also noted that the thread-like member 57 may be wound on the cylindrical unwoven fabric layer 56, either sparsely such that there is left a clearance between adjacent ones of a plurality of helical turns of the thread-like member 57, or densely such that such a clearance is not left between the adjacent helical turns. Further, the thread-like member 57 may be wound in two or more layers on the cylindrical unwoven fabric layer 56.

In the present embodiment, the thread-like member 57 is wound densely on the opposite axial end portions of the cylindrical unwoven fabric layer 56, without a clearance between the adjacent helical turns, and sparsely on the other axial portion. Accordingly, the opposite axial end portions of the cylindrical film body 55 and cylindrical unwoven fabric layer 56 are tightly fixed to the opposite axial end portions of the cylindrical substrate 38, to prevent the cylindrical film body 55 and cylindrical unwoven fabric layer 56 from being removed from the cylindrical substrate 38. Further, the opposite axial end portions of the cylindrical film body 55 and cylindrical unwoven fabric layer 56, and the opposite end portions of the thread-like member 57 wound on the opposite axial end portions of the cylindrical film body 55 and cylindrical unwoven fabric layer 56 are held squeezed by and between the bottom surfaces of the cutout grooves 47 of the first and second caps 43, 44, and the outer circumferential surfaces of the sealing rubbers 41, making it possible to ensure liquid tightness between the inner circumferential surface of the cylindrical film body 55 and the outer circumferential surface of the cylindrical substrate 38, and also liquid tightness between the outer circumferential surface of the cylindrical film body 55 and the inner circumferential surface of the cylindrical unwoven fabric layer 56.

As described above, the micro-bubble generating sleeve 34 is configured such that the cylindrical film body 55 and the cylindrical unwoven fabric layer 56 are fitted on the cylindrical substrate 38, with the former being disposed radially inwardly. In this configured micro-bubble generating device 34, the gas introduced into the inner space 53 through the inlet hole 54 of the cylindrical substrate 38 flows through the gas flow hole 42 formed through the cylindrical portion of the cylindrical substrate 38, and permeates through the cylindrical film body 55 and cylindrical unwoven fabric layer 56, whereby micro-bubbles (of not larger than about 50 μm) are ejected from the outer circumferential surface of the cylindrical unwoven fabric layer 56. Since the gas-permeable film constituting the cylindrical film body 55 has a water repellant property while the unwoven fabric constituting the cylindrical unwoven fabric layer 56 has a hydrophilic property, air bubbles flowing into the cylindrical unwoven fabric layer 56 as a result of permeation of the gas through the cylindrical film body 55 are broken into smaller pieces by the water existing in the cylindrical unwoven fabric layer 56, so that the size of the generated micro-bubbles can be further reduced. In addition, the size of the pores within the cylindrical unwoven fabric layer 56 is reduced by the hydrophilic thread-like member 57 wound on the entire outer circumferential surface of the cylindrical unwoven fabric layer 56, so that the size reduction of the air bubbles flowing into the cylindrical unwoven fabric layer 56 can be further promoted.

As shown in FIG. 8, the support mechanism 35 for rotatably supporting the micro-bubble generating sleeve 34 has a base plate 58. This base plate 58 is an elongate rectangular plate of a metal such as stainless steel or aluminum having a length larger than an axial length of the micro-bubble generating sleeve 34, and a width larger than a diameter of the micro-bubble generating sleeve 34. To the opposite longitudinal end portions of the base plate 58, there are welded or otherwise fixed a first support plate 59 and a second support plate 60 made of the same material as the base plate 58, such that the first and second support plates 59, 60 are opposed to each other in the longitudinal direction of the base plate 58.

A cylindrical support sleeve 61 is disposed at a position of the base plate 58 spaced from its longitudinally central portion toward the first support plate 59 and from the second support plate 60 by a distance larger than the axial length of the micro-bubble generating sleeve 34, such that the support sleeve 61 extends in the longitudinal direction of the base plate 58. The support sleeve 61 is formed of the same material as the first and second support plates 59, 60. The support sleeve 61 has an outer flange 62 in the form of a rectangular frame integrally formed at one of its opposite axial ends on the side of the first plate 59. The support sleeve 61 is welded to the upper surface of the base plate 58, at the lower end face of the outer flange 62.

Within a bore of the support sleeve 61 described above, there is disposed a rotor 63. This rotor 63 is a generally cylindrical elongate body having an outside diameter smaller than an inside diameter of the support sleeve 61 and an axial length larger than an axial length of the support sleeve 61. The rotor 63 has a communication passage 64 extending in its axial direction and open in an axially intermediate portion of its outer circumferential surface and in one of its opposite axial end faces.

This rotor 63 is inserted into the support sleeve 61 and axially positioned such that one of the opposite axial end portions of the rotor 63 that has the end face in which the communication passage 64 is open axially projects outwardly from the support sleeve 61. The rotor 63 thus axially positioned is supported rotatably about its axis by two bearings 65, 65 fitted in the inner circumferential surface of the support sleeve 61 such that the two bearings 65, 65 are axially spaced apart from each other.

On the rotor 63 described above, there are fitted two sealing rings 66, 66 formed of polytetrafluoroethylene, at respective positions between the two bearings 65, 65 such that the two sealing rings 66, 66 are spaced apart from each other in the axial direction. These sealing rings 66, 66 are slidably held in contact at their inner and outer circumferential surfaces with the outer circumferential surface of the rotor 63 and the inner circumferential surface of the support sleeve 61, so that a portion of a space defined by the outer circumferential surface of the rotor 63 and the inner circumferential surface of the support sleeve 61 and between the two sealing rings 66, 66 serves as a fluid-tight gas inlet portion 67. The communication passage 64 open in the outer circumferential surface of the rotor 63 is also open to the gas inlet portion 67, whereby the gas inlet portion 67 and the communication passage 64 are held in communication with each other.

On the utmost end part of the axial end portion of the rotor 63 which projects from the support sleeve 61, there is fixedly fitted a clamping member 68 in the form of a cylindrical body having a hole closed at its one end. This clamping member 68 has a center hole 69 formed through a central part of its bottom portion. The above-indicated utmost end part of the projecting axial end part of the rotor 63 extends through the center hole 69 into the clamping member 68, and is fixed by fixing screws 70 to the inner circumferential surface of the center hole 69 of the rotor 63.

On the other hand, the second support plate 60 has an insertion hole 71 formed through the thickness of its central portion. A shaft member 72 extends through this insertion hole 71. This shaft member 72 has a clamping portion 73 in the form of a cylindrical body with a small depth open at its one end, and a shaft portion 74 in the form of a round rod integrally formed to extend from an outer surface of the bottom wall of the clamping portion 73.

Figure 10:
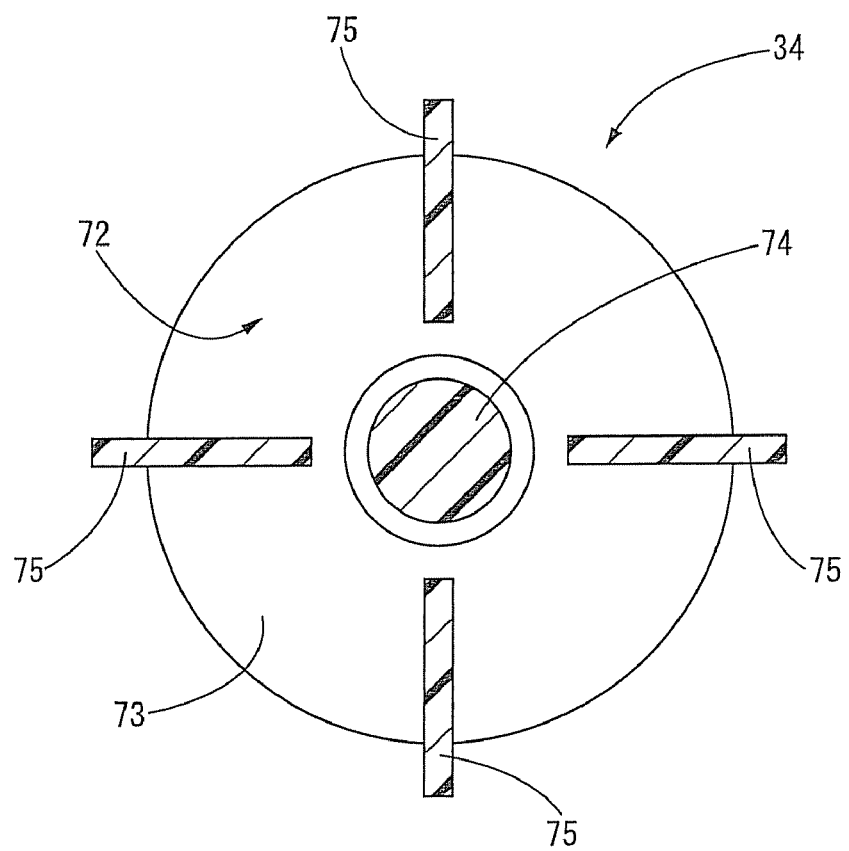
FIG. 10 is an enlarged end elevational view in cross section taken along line X-X in FIG. 8.

The clamping portion 73 of the shaft member 72 described above has integrally formed four stirring vanes 75. As shown in FIGS. 8 and 10, each of the four stirring vanes 75 is an L-shaped plate member extending along the outer surface of the bottom wall and the outer surface of the cylindrical wall of the clamping portion 73. The four stirring vanes 75 are formed integrally with the clamping portion 73 such that the four stirring vanes 75 are equiangularly spaced apart from each other in the circumferential direction of the clamping portion 73.

The shaft member 72 described above is disposed coaxially with the rotor 63 extending through the bore in the support sleeve 61, and with a predetermined distance from the rotor 63. The shaft portion 74 of the shaft member 72 thus disposed extends through the insertion hole 71 in the second support plate 60, rotatably about its axis via a bearing 76.

In the micro-bubble generating device of the present embodiment, the micro-bubble generating sleeve 34 constructed as described above is disposed so as to extend coaxially with the support sleeve 61, between the support sleeve 61 on the base plate 58 and the second support plate 60, such that one of the opposite axial ends of the micro-bubble generating sleeve 34 on the side of the first cap 43 is located on the side of the support sleeve 61 while the other axial end on the side of the second cap 44 is located on the side of the second plate 60. The second cap 44 of the micro-bubble generating sleeve 34 thus disposed is partly received within the clamping portion 73 of the shaft member 72 and fixed in the clamping portion 73 by fixing screws not shown. On the other hand, the end portion of the connecting sleeve 52 fixed to the first cap 43 of the micro-bubble generating sleeve 34 is received within the clamping member 68 fixed to the end of the axial end portion of the rotor 63 projecting from the bore of the support sleeve 61, and is fixed in the clamping member 68 by fixing screws 77.

Thus, the micro-bubble generating sleeve 34 is disposed rotatably about its axis, together with the rotor 63 rotatably supported by the support sleeve 61, while the micro-bubble generating sleeve 34 is supported by the support sleeve 61 fixed to the base plate 58 and the second support plate 60. The four stirring vanes 75 provided on the clamping portion 73 of the shaft member 72 are also rotatable with the micro-bubble generating sleeve 34 rotated with the rotor 63. Further, the communication passage 64 in the rotor 63 is held in communication with the inner space 53 within the micro-bubble generating sleeve 34, through the inlet hole 54 which consists of the bore in the connecting sleeve 52 and the through-hole 51 in the first cap 43. It follows from the foregoing description that the support mechanism 35 provided in the present embodiment includes the base plate 58, second support plate 60, shaft member 72, support sleeve 61, rotor 63 and clamping member 68.

The present embodiment is further arranged such that the submersible motor 36 is fixed by the first support plate 59 fixed to the base plate 58 and the flange portion 62 of the support sleeve 61, between the first support plate 59 and the flange portion 62 which are opposed to each other. This submersible motor 36 has the drive shaft 78 an end portion of which extends into the bore of the support sleeve 61, and the rotor 63 rotatably disposed in the bore of the support sleeve 61 is fixed to the drive shaft 78 such that the rotor 63 is rotatable with the drive shaft 78. Thus, the drive shaft 78 of the submersible motor 36 is connected to the micro-bubble generating sleeve 34 by means of the rotor 63 such that the micro-bubble generating sleeve 34 is rotatable with the drive shaft 78, so that the micro-bubble generating sleeve 34 is rotated with the rotor 63, by the submersible motor 36.

The support sleeve 61 has a through-hole 79 formed through an axially intermediate portion of its cylindrical wall. This through-hole 79 is a stepped hole consisting of an outer portion which is open in the outer circumferential surface of the support sleeve 61 and which has a relatively large diameter, and an inner portion which is open in the inner circumferential surface of the support sleeve 61 and which has a relatively small diameter. In the large-diameter portion of the through-hole 79, there is fixedly fitted a connecting sleeve 80 of a generally cylindrical shape. An open end portion of a hole of this connecting sleeve 80 is connected to an air inlet tube 81. This air inlet tube 81 has an inlet 82 at its open end remote from the connecting sleeve 80 connected thereto, for introducing air. This inlet 82 is open to the atmosphere. On the other hand, the small-diameter portion of the through-hole 79 is held in communication with the hole of the connecting sleeve 80 fixedly fitted in the large-diameter portion of the through-hole 79, and is open to the gas inlet portion 67 provided within the bore of the support sleeve 61.

In the arrangement described above, the air (atmosphere) introduced through the inlet 82 of the air inlet tube 81 is fed into the air inlet portion 67 through the air inlet tube 81, hole of the connecting sleeve 80, and through-hole 79, and is introduced into the inner space 53 through the communication passage 64 of the rotor 63 and the inlet hole 54 of the micro-bubble generating sleeve 34. It follows from this that the gas introducing mechanism 37 provided in the present embodiment is constituted by the air inlet tube 81, connecting sleeve 80, through-hole 79, communication passage 64 of the rotor 63, and inlet hole 54 of the micro-bubble generating sleeve 34.

Where the micro-bubble generating device of the present embodiment constructed as described above is used to supply oxygen into the water in an appreciative-fish or live-fish preservation water tank, for example, the micro-bubble generating sleeve 34 is supported rotatably about its horizontally extending axis, by the support mechanism 35, as shown in FIG. 8. Further, the base plate 58 to which the submersible motor 36 is fixed is disposed horizontally on the bottom of the water tank. In this condition, the inlet 82 at the end of the air inlet tube 81 remote from the connecting sleeve 80 is located above the water level, and is open to the atmosphere.

In the condition described above, an operation of the submersible motor 36 causes the micro-bubble generating sleeve 34 to be rotated at a high speed, and the stirring vanes 75 formed integrally with the second cap 44 of the micro-bubble generating sleeve 34 is rotated with the micro-bubble generating sleeve 34. As a result, a mass of the water surrounding the micro-bubble generating sleeve 34 is stirred or agitated.

As described above, the micro-bubble generating device of the present embodiment is configured such that the atmosphere is introduced into the inner space 53 of the micro-bubble generating sleeve 34, while this micro-bubble generating sleeve 34 is disposed horizontally within the water. Consequently, the air flowing from the inner space 53 into the gas flow hole 42 of the cylindrical substrate 38 permeates through the cylindrical film body 55 and the cylindrical unwoven fabric layer 56, and is ejected as micro-bubbles from the outer circumferential surface of the cylindrical unwoven fabric layer 56 into the water and thus dispersed in the water. Further, the size of the air bubbles ejected from the outer circumferential surface of the cylindrical unwoven fabric layer 56 is further reduced, owing to not only the water repellant cylindrical film body 55 and the hydrophilic cylindrical unwoven fabric layer 56 which are wound on the cylindrical substrate 38, but also the hydrophilic thread-like member 57 wound on the entire outer circumferential surface of the cylindrical unwoven fabric layer 56.

In particular, the present embodiment is configured such that the micro-bubble generating sleeve 34 is rotated at a high speed by the submersible motor 36 while the external air is introduced into the inner space 53 in the micro-bubble generating sleeve 34, by the gas introducing mechanism 37. Accordingly, the gas which has permeated through the cylindrical film body 55 and the cylindrical unwoven fabric layer 56 is divided into micro-bubbles by the pores open in the outer circumferential surface of the cylindrical unwoven fabric layer 56. Namely, the air bubbles growing at a boundary between the cylindrical unwoven fabric layer 56 and the water are subject to shearing by the high-speed rotation of the micro-bubble generating sleeve 34, in an initial stage of generation of the air bubbles in the water as a result of permeation of the gas through the cylindrical film body 55 and the cylindrical unwoven fabric layer 56. The air bubbles thus generated are rapidly removed from the openings of the pores, owing to the hydrophilic property of the cylindrical unwoven fabric layer 56. As a result, the micro-bubbles the size reduction of which is promoted are ejected from the outer circumferential surface of the cylindrical unwoven fabric layer 56 of the micro-bubble generating sleeve 34.

Further, the high-speed rotation of the micro-bubble generating sleeve 34 in the micro-bubble generating device of the present embodiment, along with the hydrophilic property of the cylindrical unwoven fabric layer 56 and the ejection of the micro-bubbles therefrom, make it possible to minimize a risk of gathering and adhesion of microorganisms, suspended matters (other than the microorganisms) and other foreign matters in the water on and to the outer circumferential surface of the cylindrical unwoven fabric layer 56. Further, even if the foreign matters adhere to the outer circumferential surface of the cylindrical unwoven fabric layer 56, the foreign matters can be effectively removed from the outer circumferential surface of the cylindrical unwoven fabric layer 56 by a centrifugal force produced by the high-speed rotation of the micro-bubble generating sleeve 34.

Thus, the present embodiment assures effective prevention of reduction of areas of opening of the multiple pores in the outer circumferential surface of the cylindrical unwoven fabric layer 56, and volumes of the pores, which reduction would take place due to the adhesion of the foreign matters to the outer circumferential surface of the cylindrical unwoven fabric layer 56 during the use of the micro-bubble generating sleeve 34 in the water for a long period of time.

In the micro-bubble generating device of the present embodiment described above, therefore, a sufficiently large number of effectively small-sized micro-bubbles can be ejected and dispersed into the water with a high degree of stability, during a long use of the device in the water. Accordingly, oxygen can be extremely effectively supplied into the water for a long period of use of the micro-bubble generating device for supplying the oxygen into the water in a water tank such as the appreciative-fish or live-fish preservation water tank.

The present micro-bubble generating device can also exhibit a desired effect with an extremely high degree of stability for a long period of time, where the device is used as a device for activating domestic animals or plants, or purifying wastewater or drainage, for instance.

In the micro-bubble generating device of the present embodiment, air within the inner space 53 of the micro-bubble generating sleeve 34 is sucked into the pores within the cylindrical film body 55 and the cylindrical unwoven fabric layer 56 by the centrifugal force produced by the rotation of the micro-bubble generating sleeve 34, so that the inner space 53 tends to be in a reduced pressure state. In view of this, the inlet 82 of the air inlet tube 81 is open to the atmosphere, so that the air can be continuously introduced into the inner space 53 of the micro-bubble generating sleeve 34, permitting stable and continuous ejection of the micro-bubbles from the outer circumferential surface of the cylindrical unwoven fabric layer 56, without the air inlet tube 81 being connected to a compressor or any other compressed-air supply source for supplying the air. Further, unlike the conventional micro-bubble generating device, the present device does not have a complicated construction provided with both of a screw portion and a cutter portion.

Thus, the micro-bubble generating device of the present embodiment is advantageously small-sized and simplified in construction owing to elimination of both of the screw portion and the cutter portion and an accessory device such as the compressed-air supply source. In addition, the present device is available with extremely reduced installation and running costs.

For obtaining the various advantages described above, it is important to rotate the micro-bubble generating sleeve 34 about its axis in the water. Although the rotating speed is not particularly limited, it is preferably at least 500 rpm, more preferably at least 1000 rpm. Practically, the rotating speed is not higher than about 5000 rpm. The rotation of the micro-bubble generating sleeve 34 at the suitable speed permits promotion of the advantages with a higher degree of stability.

The present embodiment is further configured such that the water surrounding the micro-bubble generating sleeve 34 is stirred or agitated by the rotation of the stirring vanes 75 with the micro-bubble generating sleeve 34. Accordingly, the micro-bubbles ejected from the outer circumferential surface of the cylindrical unwoven fabric layer 56 are more effectively dispersed into a larger volume of the water. As a result, the desired dispersion of the micro-bubbles into the water can be attained with a higher level of stability.

In addition, the micro-bubble generating device of the present embodiment is configured such that the elongate cylindrical micro-bubble generating sleeve 34 is supported by the support mechanism 35, rotatably about its horizontally extending axis of rotation, so that the micro-bubbles ejected from the outer circumferential surface of the cylindrical unwoven fabric layer 56 can be efficiently dispersed into the water.

While the specific embodiments of this invention have been described in detail, for illustrative purpose only, it is to be understood that the present invention is not limited to the details of the illustrated embodiments.

Figure 11:
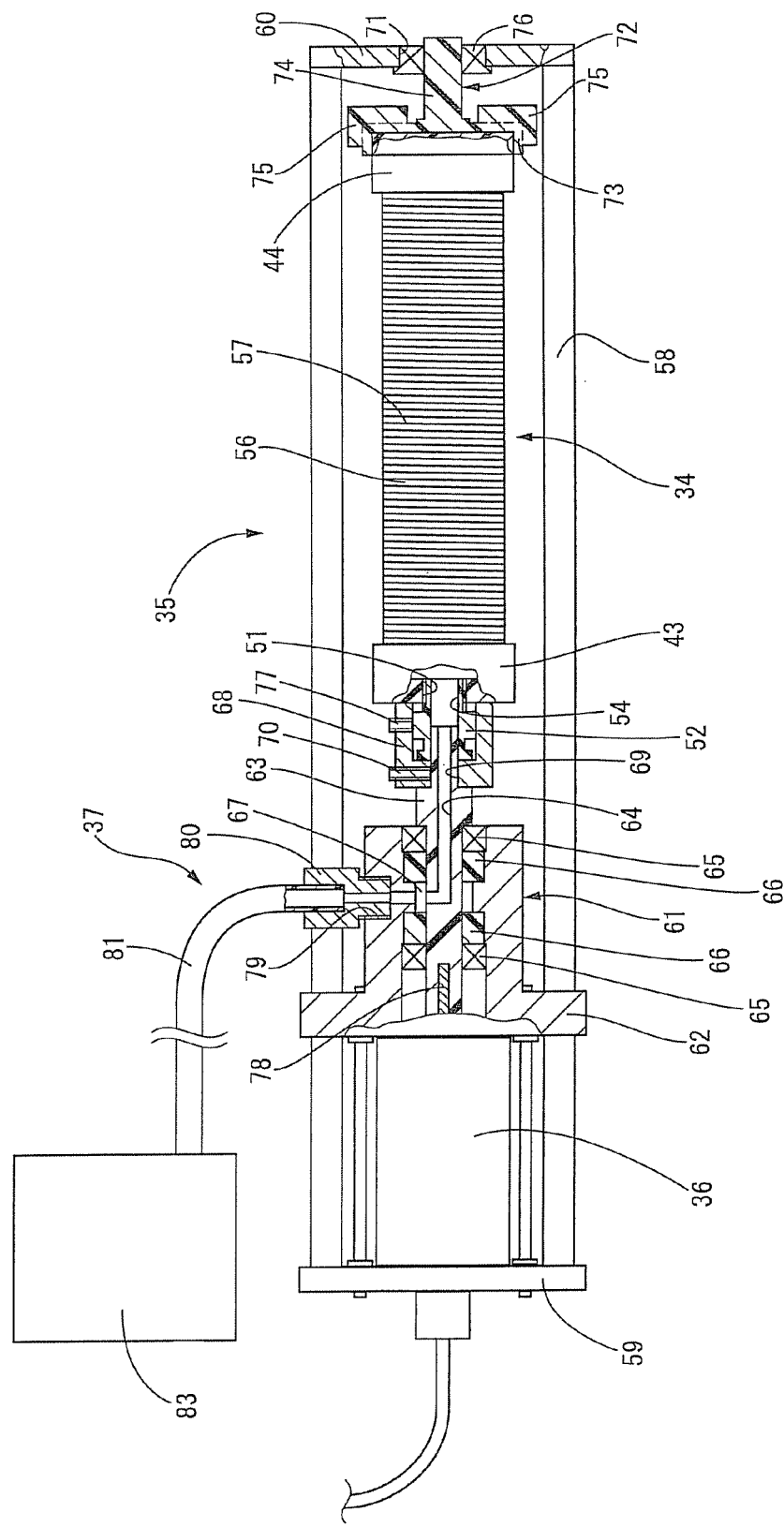
FIG. 11 is a view corresponding to FIG. 8, showing another embodiment of the micro-bubble generating device of the present invention.

In the embodiment described above, for example, the inlet 82 of the air inlet tube 81 of the gas introducing mechanism 37 is open to the atmosphere. However, the inlet 82 may be connected to a compressed-air supply source 83 such as a compressor, as shown in FIG. 11. In this case, compressed air is forced to be introduced into the inner space 53 of the micro-bubble generating sleeve 34. As a result, the micro-bubbles can be ejected from the outer circumferential surface of the cylindrical unwoven fabric layer 56 with a high degree of reliability and stability, even while the micro-bubble generating sleeve 34 is not in a rotating state. It is noted that the same reference signs as used in FIGS. 8-10 are used in the embodiment of FIG. 11, and in the following embodiments shown in FIGS. 12-15 described below, to identify the portions and members which are identical in construction as those in the first embodiment described above, and those portions and members will not be described in detail.

Further, the micro-bubble generating sleeve 34 need not be continuously rotated, and may be intermittently rotated, irrespective of whether the inlet 82 of the air inlet tube 81 is connected to the compressed-air supply source 83 or open to the atmosphere.

The shape, location of formation and number of the stirring vanes 75 are not limited, provided the stirring vanes 75 are rotated with the micro-bubble generating sleeve 34, to permit agitation of the water surrounding the micro-bubble generating sleeve 34.

Figure 12:
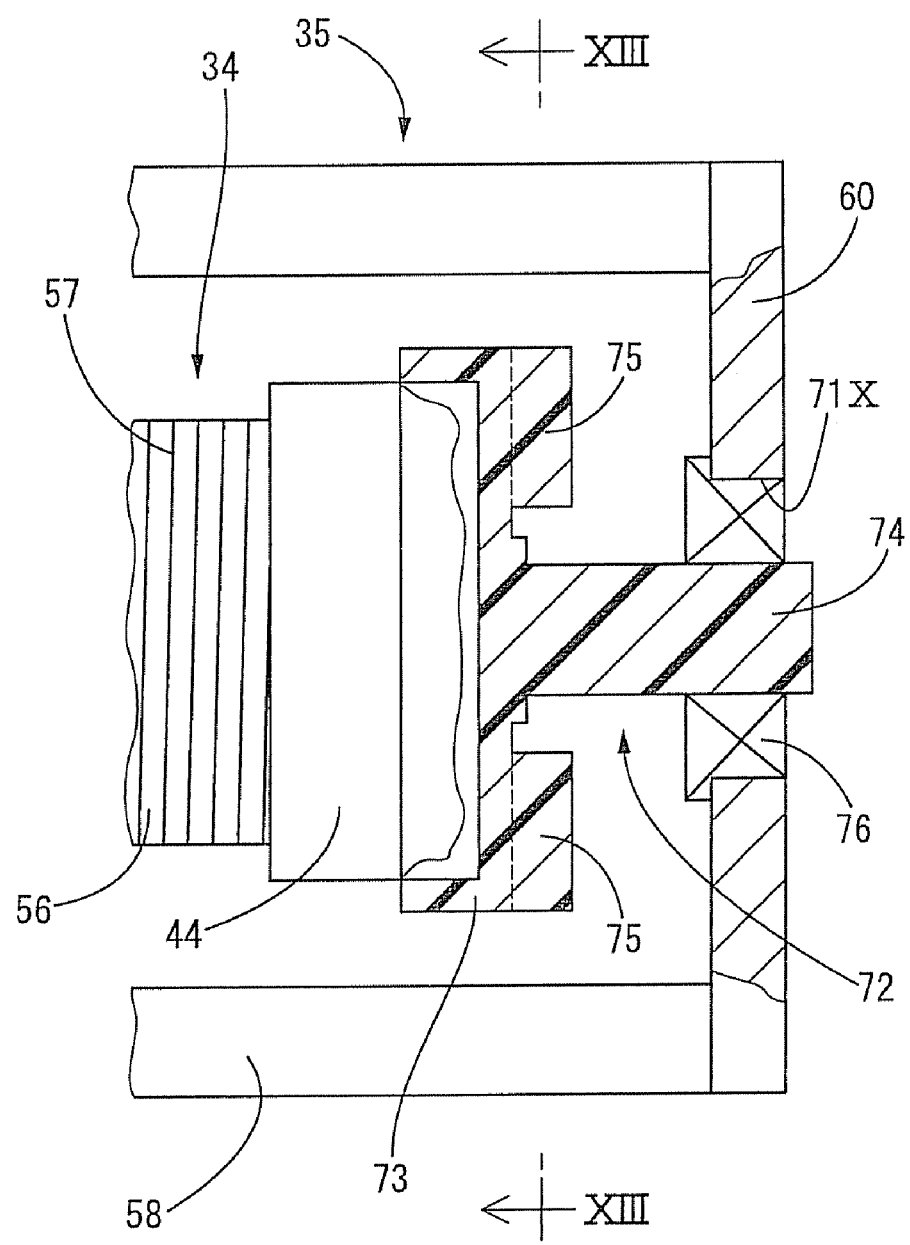
FIG. 12 is a partly enlarged view corresponding to that of FIG. 8, showing a yet further embodiment of the micro-bubble generating device of the present invention.
Figure 13:
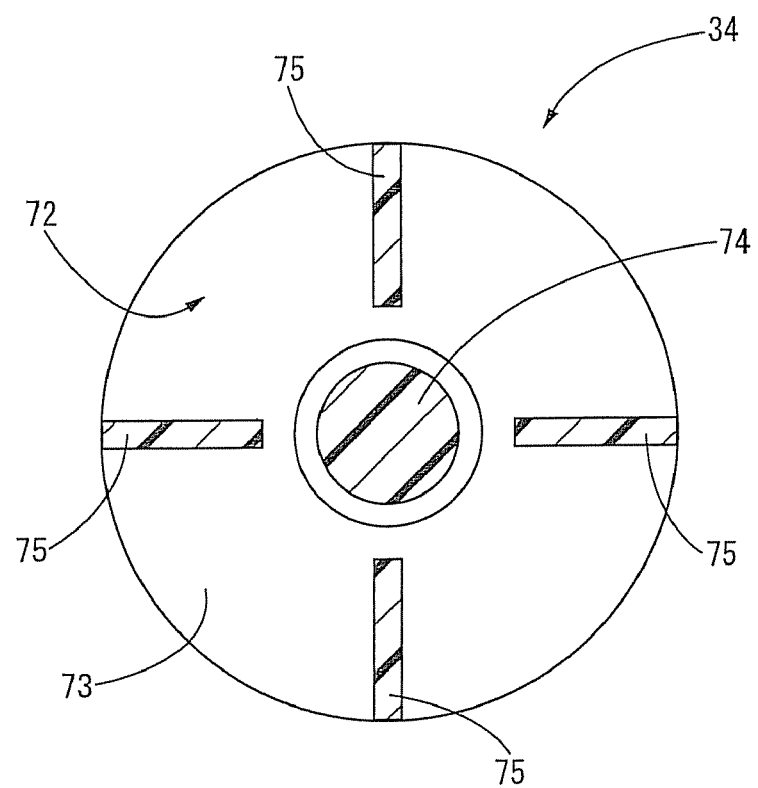
FIG. 13 is an end elevational view in cross section taken along line XIII-XIII in FIG. 12.

As shown in FIGS. 12 and 13, specifically, a plurality of stirring vanes 75 (four vanes in this specific example) each in the form of a rectangular plate, for example, may be formed integrally on the outer surface of the bottom wall of the clamping portion 73 of the shaft member 72 of the support mechanism 35 fixed to the second cap 44 of the micro-bubble generating sleeve 34.

Figure 14:
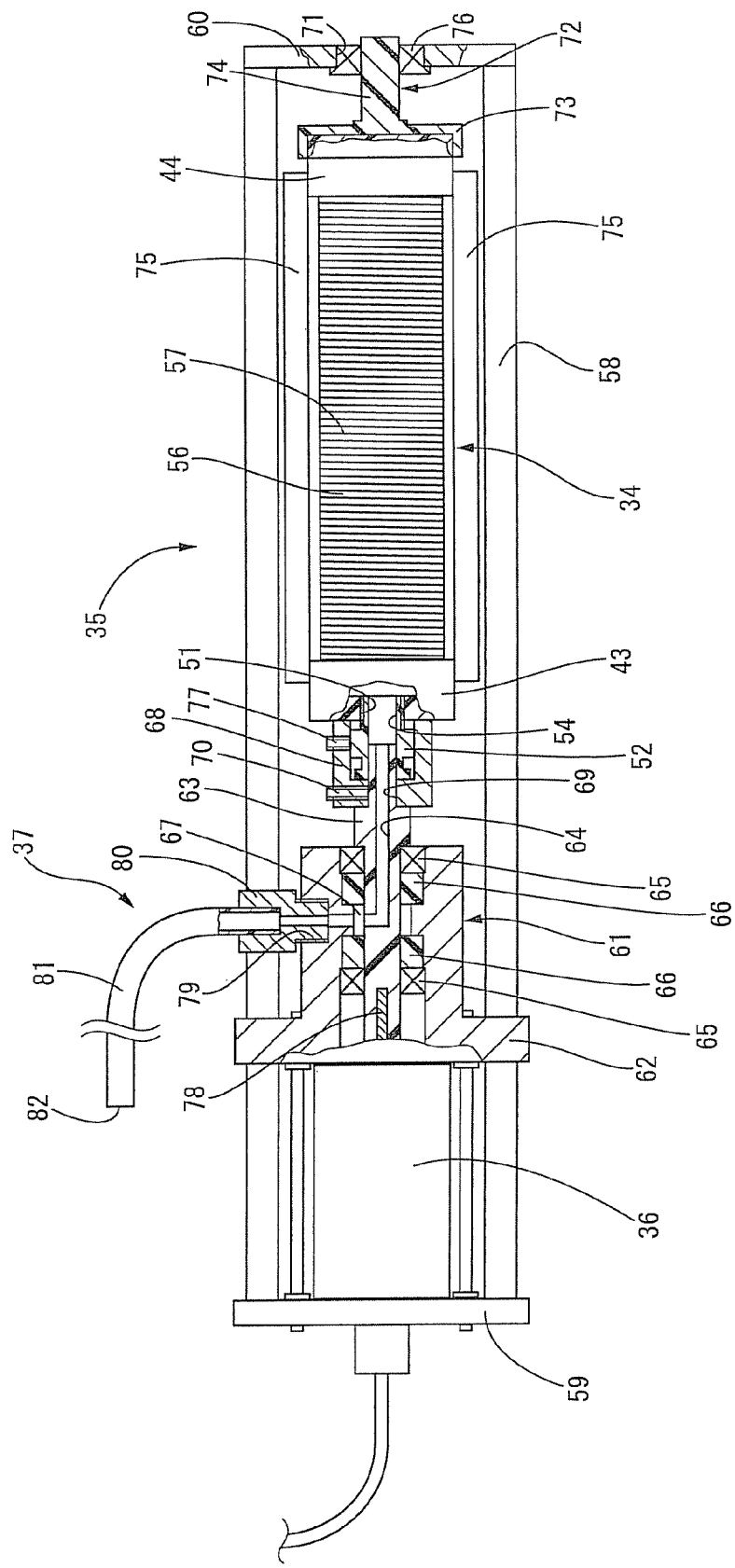
FIG. 14 is a view corresponding to FIG. 8, showing another embodiment of the micro-bubble generating device of the present invention.

Alternatively, as shown in FIG. 14, a plurality of stirring vanes 75 (two vanes in this specific example) each in the form of an elongate rectangular plate may be formed so as to extend between the first cap 43 and the second cap 44 of the micro-bubble generating sleeve 34.

Figure 15:
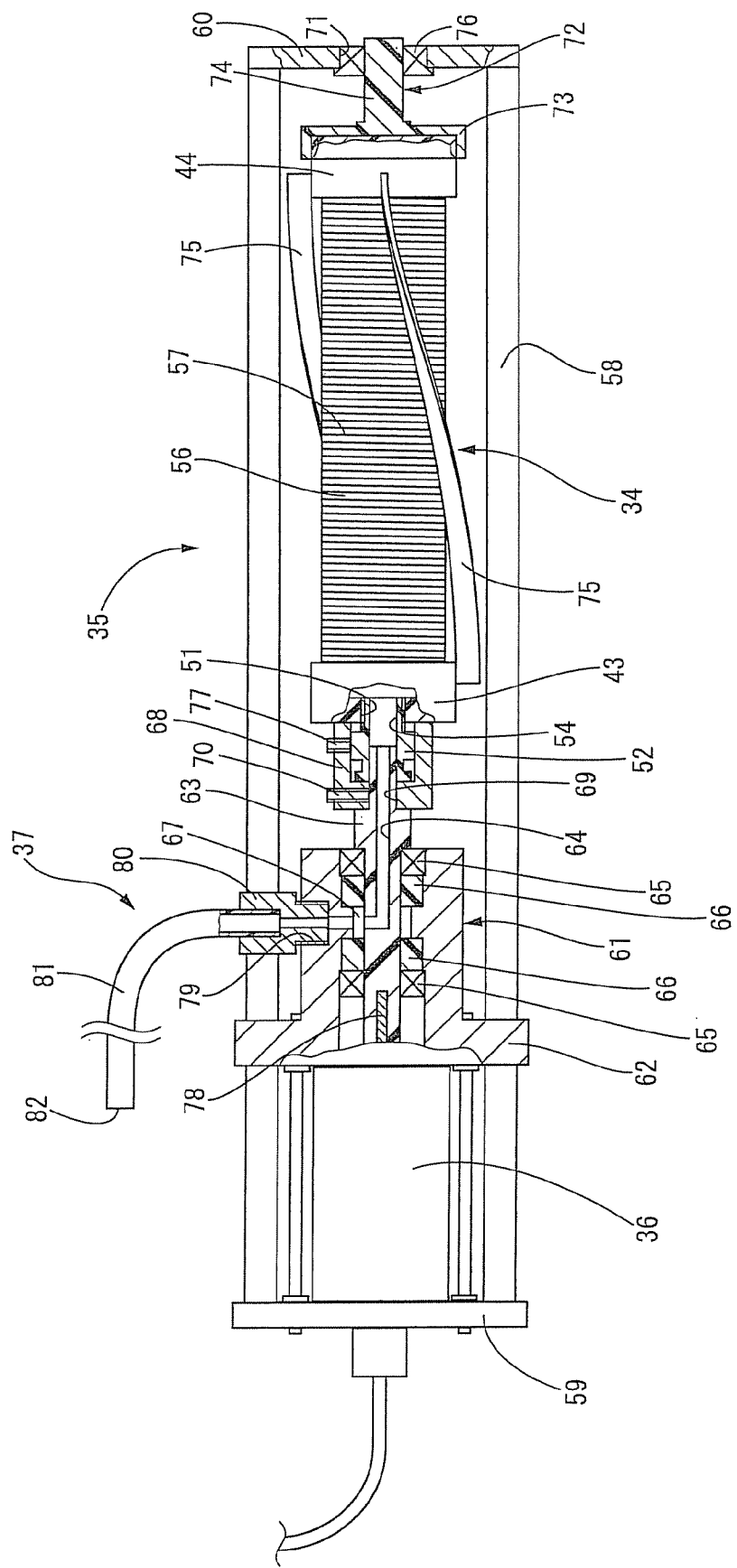
FIG. 15 is a view corresponding to FIG. 8, showing a still further embodiment of the micro-bubble generating device of the present invention.

Further alternatively, as shown in FIG. 15, a plurality of stirring vanes 75 (two vanes in this specific example) each in the form of a helically extending curved plate may be formed so as to extend between the first cap 43 and the second cap 44 of the micro-bubble generating sleeve 34.

In each of the cases wherein the stirring vanes 75 are provided in the forms shown in FIGS. 12-15, the micro-bubbles ejected from the outer circumferential surface of the cylindrical unwoven fabric layer 56 are more efficiently dispersed into a larger volume of the water. As a result, the dispersion of the micro-bubbles into the water provides a desired effect with a higher degree of reliability and stability. It will be understood that the sizes of the stirring vanes 75 as shown in FIGS. 8 and 12-15 are made larger than the actual sizes, for easier understanding of their structures.

As rotary driving means for rotating the micro-bubble generating sleeve 34 about its axis, various known rotary drive devices other than the submersible motor 36 used in the illustrated embodiments may be employed. The rotary driving means need not automatically rotate the micro-bubble generating sleeve 34, and may be a device manually operated to rotate the micro-bubble generating sleeve 34, with a handwheel or the like, provided the manually operated device permits a sufficiently high speed of rotation of the micro-bubble generating sleeve 34.

It is to be understood that the construction of the gas introducing mechanism 37 is not limited to that of the illustrated embodiments, provided the gas introducing mechanism 37 permits introduction of the external gas into the inner space 53 of the micro-bubble generating sleeve 34.

It is to be understood that the present invention may be embodied with various other changes, modifications and improvements not specifically illustrated therein. It is needless to say that such embodiments are within the scope of the present invention, as long as those embodiments do not depart from the spirit of the invention.

What is claimed is:

1. A micro-bubble generating device comprising:
a liquid flow body in the form of a cylindrical column having a flow passage formed in its outer circumferential surface so as to extend in its axial direction so that a liquid flows through the flow passage, an inlet opening which is formed in one of its opposite axial end portions and through which the liquid flows into the flow passage, and an outlet opening which is formed in the other axial end portion and through which the liquid is discharged from the flow passage, wherein the outer circumferential surface is covered by a gas-permeable film so as to close an opening of the flow passage open in the outer circumferential surface; and
a casing in the form of a cylindrical sleeve which is open at its opposite ends and which has a gas inlet hole formed through its cylindrical wall and accommodates therein the liquid flow body, the casing and the outer circumferential surface of the liquid flow body define therebetween an internal space accommodating a pressurized gas introduced into the cylindrical sleeve through the gas inlet hole,
wherein the flow passage is helically formed in the outer circumferential surface, and the gas-permeable film has a structure which normally has a low degree of gas permeability, and permits generation of micro-bubbles in the liquid by forced permeation of the pressurized gas therethrough.

2. The micro-bubble generating device according to claim 1, wherein the helically formed flow passage has a width small enough to limit a rate of flow of the liquid through the inlet opening, for increasing a velocity of flow of the liquid from the inlet opening through the flow passage, whereby the micro-bubbles growing at a boundary between the gas-permeable film and the liquid in the flow passage are subject to shearing by the flow of the liquid at the increased velocity through the flow passage, in an initial stage of generation of the micro-bubbles in the liquid as a result of permeation of the pressurized gas through the gas-permeable film, so that the micro-bubbles generated are a size of which is further reduced in the liquid.

3. The micro-bubble generating device according to claim 1, further comprising a flow regulating valve to control a rate of flow of the liquid through the inlet opening, thereby controlling a velocity of flow of the liquid through the flow passage, and a regulator to control a pressure of the pressurized gas introduced into the internal space through the gas inlet hole.

4. The micro-bubble generating device according to claim 3, wherein the gas-permeable film is formed from a resin film having crazes generated therein.

\* \* \* \* \*